US008230110B2

(12) United States Patent
Vegesna et al.

(10) Patent No.: US 8,230,110 B2
(45) Date of Patent: Jul. 24, 2012

(54) WORK-CONSERVING PACKET SCHEDULING IN NETWORK DEVICES

(75) Inventors: Srihari Vegesna, San Jose, CA (US); Sarin Thomas, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 199 days.

(21) Appl. No.: 12/835,481

(22) Filed: Jul. 13, 2010

(65) Prior Publication Data
US 2011/0216773 A1 Sep. 8, 2011

Related U.S. Application Data

(60) Provisional application No. 61/309,753, filed on Mar. 2, 2010.

(51) Int. Cl.
*G06F 15/173* (2006.01)

(52) U.S. Cl. ........ 709/238; 709/213; 709/220; 709/223; 710/1; 710/2; 710/3; 710/4; 710/5; 710/6; 710/7; 710/20; 710/33; 710/34; 710/52

(58) Field of Classification Search .................. 709/213, 709/220, 223, 238; 710/1, 2, 3, 4, 5, 6, 7, 710/20, 33, 34, 52
See application file for complete search history.

(56) References Cited

U.S. PATENT DOCUMENTS

| 6,237,059 | B1 * | 5/2001 | Dean et al. ............ 711/100 |
| 7,277,448 | B1 * | 10/2007 | Long et al. ............ 370/412 |
| 7,433,953 | B1 * | 10/2008 | Kappler et al. ............ 709/226 |
| 7,522,609 | B2 * | 4/2009 | Cohen et al. ............ 370/395.42 |
| 7,675,926 | B2 * | 3/2010 | Olsen et al. ............ 370/412 |
| 7,978,725 | B2 * | 7/2011 | Gong et al. ............ 370/445 |
| 8,086,641 | B1 * | 12/2011 | Carr ............ 707/797 |
| 2004/0156367 | A1 * | 8/2004 | Albuquerque et al. ..... 370/395.4 |
| 2005/0036495 | A1 * | 2/2005 | Wishneusky et al. ....... 370/395.4 |
| 2005/0094643 | A1 * | 5/2005 | Wang et al. ............ 370/395.4 |
| 2005/0220115 | A1 * | 10/2005 | Romano et al. ............ 370/395.4 |

* cited by examiner

*Primary Examiner* — Ilwoo Park
*Assistant Examiner* — Jasjit Vidwan
(74) *Attorney, Agent, or Firm* — Shumaker & Sieffert, P.A.

(57) ABSTRACT

In general, techniques are described for performing work conserving packet scheduling in network devices. For example, a network device comprising queues that store packets and a control unit may implement these techniques. The control unit stores data defining hierarchically-ordered nodes, which include leaf nodes from which one or more of the queues depend. The control unit executes first and second dequeue operations concurrently to traverse the hierarchically-ordered nodes and schedule processing of packets stored to the queues. During execution, the first dequeue operation masks at least one of the selected ones of the leaf nodes from which one of the queues depends based on scheduling data stored by the control unit. The scheduling data indicates valid child node counts in some instances. The masking occurs to exclude the node from consideration by the second dequeue operation concurrently executing with the first dequeue operation, which may preserve work in certain instances.

25 Claims, 12 Drawing Sheets

WORK-CONSERVING PACKET SCHEDULING IN NETWORK DEVICES

This application claims the benefit of U.S. Provisional Application No. 61/309,753, filed Mar. 2, 2010, the entire contents of which are incorporated by reference herein.

TECHNICAL FIELD

The invention relates to computer network and, more particularly, transmitting packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Network devices referred to as routers are responsible for routing the packets through the packet-based network. The routers receive traffic from a wide variety of source devices and forward this traffic in accordance with various priorities. Usually, a service provider that owns the packet-based network provides various service levels to customers. For example, the service provider may offer a premium high bandwidth data service, a mid-range bandwidth data service and a low bandwidth data service. A customer subscribes to one of these service levels and the service provider provisions the routers to associate traffic originating from this customer's source device with the particular priority associated with the service level subscribed to by the customer. This priority ensures the customer receives the agreed upon bandwidth of the service level subscribed to by the customer.

In response to receiving a packet from the source device, the router first classifies the packet as originating from the source device and identifies the particular priority provisioned in the router for the source device. The router then typically stores the packet as one or more discrete data units referred to as "chunks" in one of a number of queues that is associated with the determined priority. The router services the queues in a manner that satisfies each of the defined priorities. For example, during operation, the router performs dequeue operations in accordance with the provisioned priorities to select chunks from the queues to schedule delivery of the packets. In some instances, the router executes multiple dequeue operations in an overlapping manner to concurrently select and service multiple queues. As one example, a router may implement dequeue and chunk scheduling operations in a pipelined fashion such that multiple chunks of a packet are being dequeued and scheduled for processing at any given point in time. By executing these dequeue operations concurrently, the router improves the number of chunks that can be serviced in a given amount of time. However, overlapping execution of these dequeue and scheduling operations may, in some instances, result in scheduling conflicts that waste processing resources and temporarily reduce packet throughput.

SUMMARY

In general, techniques are described that promote efficient overlapping execution of multiple packet determinate, chunk-based dequeue operations within a packet-processing network device to reduce if not eliminate scheduling conflicts. The techniques may be especially beneficial in packet-processing devices that utilize deeply pipelined, multi-threaded dequeue operations in conjunction with priority-based queuing mechanisms. The techniques may allow such network devices to maximize pipeline utilization (i.e., avoiding pipeline bubbles in which no chunk is dequeued) and yet generally adhere to priority-based queue servicing. For example, in devices having deeply pipelined, multi-threaded dequeue operations, the number of clock cycles for completion of a packet-determinate chunk-based dequeue operation can exceed the required packet processing line rate of the device. In such cases, dequeue operations executing concurrently in different stages of the pipeline may resolve during execution to the same priority queue and, in some cases, drain the queue so as to cause one or more of the dequeue operations to fail to produce a dequeued chunk for processing by the network device. The techniques described herein provide the multi-threaded, pipelined packet scheduler a higher-level of control at each stage of the pipeline so as to avoid or reduce the likelihood of such an event.

In one embodiment, a method comprises storing, with a network device, data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents a network interface of the network device that provides a maximum bandwidth and the remaining nodes of the plurality of nodes represent allocations of portions of the maximum bandwidth provided by the network interface. The method also comprises storing, with the network device, corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes. The method further comprises executing, with the network device, a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering, and executing, with the network device, a second dequeue operation concurrently with the execution of the first dequeue operation, the method also comprises masking, with the first dequeue operation of the network device, at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation, wherein during execution, the second dequeue operation traverses the plurality of hierarchically-ordered nodes and schedules delivery of a portion of a second packet stored to one of the plurality of queues, and processing the portion of the first packet and the portion of the second packet with the network device as these portions are dequeued.

In another embodiment, a network device comprises a network interface that provides a maximum bandwidth, a plurality of queues that store one or more portions corresponding to one or more network packets and a control unit that stores data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents the network interface that provides the maximum bandwidth and the remaining nodes of the plurality of nodes represent allocations of portions of the maximum bandwidth provided by the network interface. The control unit also stores corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes. The control unit includes a dequeue module that executes, a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering. The dequeue module also executes a second dequeue operation concurrently with the execution of the first dequeue operation. The first dequeue operation masks at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation. During execution, the second dequeue operation traverses the plurality of hierarchically-ordered nodes and schedules delivery of a portion of a second packet stored to one of the plurality of queues. The control unit processes the portion of the first packet and the portion of the second packet with the network device as these portions are dequeued.

In another embodiment, a non-transitory computer-readable storage medium comprises instructions, that when executed by a processor, cause the processor to store data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents a network interface of a network device that provides a maximum bandwidth and the remaining nodes of the plurality of nodes represent allocations of portions of the maximum bandwidth provided by the network interface, store corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes, execute a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering, execute a second dequeue operation concurrently with the execution of the first dequeue operation, mask, with the first dequeue operation, at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation, wherein during execution, the second dequeue operation traverses the plurality of hierarchically-ordered nodes and schedules delivery of a portion of a second packet stored to one of the plurality of queues, and process the portion of the first packet and the portion of the second packet with the network device as these portions are dequeued.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
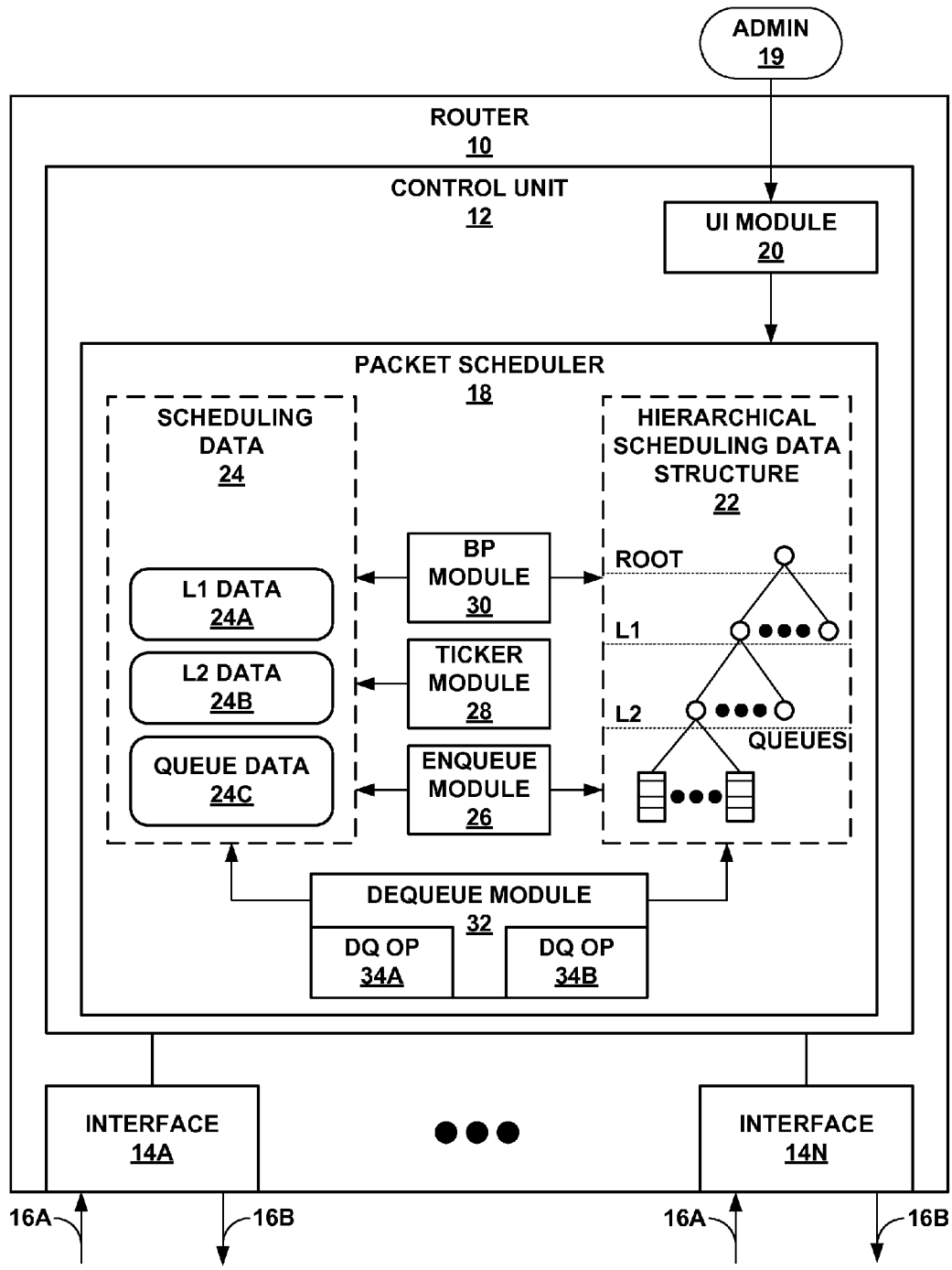
FIG. 1 is a block diagram illustrating an exemplary router that implements the efficient packet scheduling techniques described in this disclosure.

FIG. 1 is a block diagram illustrating an exemplary router 10 that implements the efficient scheduling techniques described in this disclosure. Router 10 is representative of one type of network device capable of implementing the efficient scheduling techniques of this disclosure. Other network devices, such as switches, hubs, intrusion detection and prevention (IDP) devices, wide area network (WAN) acceleration (WX) devices or any other network device that forwards packets, may implement the techniques of this disclosure to facilitate more efficient scheduling.

Router 10 includes a control unit 12 and network interfaces 14A-14N ("interfaces 14"). Control unit 12 represents a collection of hardware components, which in some instances executes software in the form of instructions stored to a computer readable medium, to implement the techniques of this disclosure. For example, control unit 12 may comprise any combination of one or more of processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure.

Although not shown in the example of FIG. 1, control unit 12 may include a routing engine in some instances that is responsible for storing and maintaining routing data in a routing information base (RIB) reflective of the current topology of the network in which router 12 resides. In these instances, control unit 12 also includes a forwarding engine, which again is not shown in the example of FIG. 1. The forwarding engine is responsible for forwarding data units, such as Internet Protocol (IP) packets, via an appropriate one of interfaces 14. The routing engine resolves the routing data in the RIB to select a route to each routable destination and, based on the selections, generates a forwarding information base (FIB) of the forwarding engine to map packet keying information to next hops and corresponding output interfaces 14. Each next hop represents a next device in the resolved route that is adjacent to router 10 within the network. The forwarding engine forwards packets in accordance with the next hop information installed within the FIB.

Interfaces 14 generally each represents a physical and/or logical network interface to another network device external from router 10 to receive and transmit data units via incoming and outgoing links. Interfaces 14 receive incoming packets 16A and send outgoing packets 16B via incoming and outgoing links, respectively. Interfaces 14 forward incoming packets 16A to control unit 12 for processing and receive outgoing packets 16B from control unit 12 after control unit 12 has processed the packet.

With respect to instances where control unit 12 implements the routing and forwarding engines, the forwarding engine receives incoming packets 16A and determines which of interfaces 14 connects to the next hop of the route that reaches the intended destinations of packets 16A. After determining the appropriate one of interfaces 14, the forwarding engine forwards the one of packets 16A to the appropriate one of interfaces 14, which forwards the packet as one of outgoing packets 16B. In one example, the techniques described herein are implemented in the forwarding engine of control unit 12. The techniques of this disclosure should not be limited in this respect, and for this reason the techniques are described with respect to a general control unit 12.

To process or otherwise forward packets, control unit 12 includes a packet scheduler 18 that generally schedules the order in which incoming packets 16A are serviced and forwarded to a next hop as outgoing packets 16B. Packet scheduler 18 schedules packets in accordance with different priorities associated with the packets so as to provide different classes of service (CoS). Packet scheduler 18 provides prioritized scheduling so that packets associated with different services, such as a Voice over IP (VoIP) service, an Internet data service, or a video service (including a video service referred to IP television or IPTV), can be scheduled in a manner that best meets these services requirements. Often, the service provider that operates the network in which router 12 resides sells packages of these services to customers. Once such package referred to as a "triple-play" package provides a VoIP service, an Internet data service and a video service to a subscribing customer. Based on the package selected by the customer, router 12 is provisioned to associate traffic from each of the services with a given priority. Consequently, packet scheduler 18 provides prioritized scheduling to facilitate the delivery of different services to customer devices.

To illustrate, consider a customer that subscribes to the above noted triple-play package that provides the customer with a VoIP service, an Internet data service and a video service. A network administrator, such as administrator 19 ("admin 19"), either directly or indirectly by way of a provisioning system provisions packet scheduler 18 to provide prioritized scheduling for the triple-play services to which the customer has subscribed. Control unit 12 includes a user interface (UI) module 20 ("UI module 20") that presents one or more user interfaces with which admin 19 interacts to provision packet scheduler 18. UI module 20 may be, for example, a command line interface (CLI) or a graphical user interface (GUI). In some instances, UI module 20 receives input automatically generated by scripts or other software agents to provision packet scheduler 18 so as to avoid manual provisioning by admin 19.

Admin 19 interfaces with one or more interfaces presented by UI module 20 to provision packet scheduler 18 to provide the new customer with the triple-play services. In this example, packet scheduler 18 includes a hierarchical scheduling data structure 22 to facilitate the prioritized scheduling of incoming packets 16A and, as part of provisioning packet scheduler 18, admin 19 interfaces with packet scheduler 18 to provision hierarchical scheduling data structure 22 to define treatment of traffic flows associated with each service of triple-play services to which the new customer has subscribed. Hierarchical scheduling data structure 22 is shown in the example of FIG. 1 to resemble a tree data structure with a root node, a number of layer 1 (L1) nodes dependent from the root node, a number of layer 2 (L2) nodes dependent from respective ones of the L1 nodes and a number of queues dependent form respective ones of the L2 nodes. The term "node" refers to a data structure capable of storing dependencies to child nodes and parent nodes, as well as, any other data of relevance to its location in hierarchical scheduling data structure 22, including different lists of dependent nodes or queues accessible from the parent node and of the same priority. In this respect, hierarchical scheduling data structure 22 represents data defining nodes arranged in a hierarchical ordering, where each of the hierarchically-ordered nodes identifies a relationship between a root node of the hierarchical-ordered nodes and the queues. While shown as a tree data structure, the techniques should not be limited to tree data structures but may be implemented with respect to any form of data structure, such as linked lists, hash tables, graphs, or any other data structure capable of assigning hierarchical orderings.

To provision hierarchical scheduling data structure 22, admin 19 first selects one of a first layer of nodes ("L1 nodes") defined by hierarchical scheduling data structure 22. In the example of FIG. 1, each of L1 nodes represent a different stream or allocation of bandwidth on a physical interface represented by the root node. For example, a first one of L1 nodes may represent a 100 gigabyte (GB)/s stream while another one of L1 nodes may represent a 50 GB/s stream for an interface represented by the root node. Typically, there are a set or static number of L1 nodes available for partitioning a physical interface, as represented by the root node, into streams of varying, or sometimes, similar bandwidth partitions. This set number is usually a factor of two so that it can be represented in an array of bits, such as 128 L1 nodes that can be represented by a 128-bit array. Admin 19, therefore, selects one of the 128 μl nodes having a bandwidth available for use by the new customer.

Admin 19 continues to provision the service priority for the new customer's triple-play services by creating or selecting one of a plurality of layer two nodes ("L2 nodes") and assigning this L2 node to the selected L1 node. The L2 nodes generally represent a particular customer's share of the stream represented by the selected L1 node from which the L2 node depends. Similar to L1 nodes, L2 nodes may be defined as a set number of nodes that is a factor of two so that these nodes are capable of being represented as an array of bits. For purposes of illustration it is assumed that there are 256 L2 nodes that are capable of being represented by a 256-bit array. Admin 19 selects one of the 256 L2 nodes not currently assigned to a L1 node and associated with a particular customer via an interface presented by UI module 20 and assigns this L2 node to the customer while also associating the selected L2 node with the previously selected L1 node again through interactions with the same or a different user interface presented by UI module 20.

In this way, hierarchical scheduling data structure 22 provides for more granular provisioning of bandwidth of a network interface to customers and, more specifically, the different prioritized data communications for those customers. Rather than have a single level of L1 nodes from which the queues depend, hierarchical scheduling data structure 22 provides a number of intermediate levels between the L1 nodes representative of streams and the queues to further segment allocation of bandwidth to customers. While shown as including root, L1, and L2 nodes for ease of illustration purposes, hierarchical scheduling data structure 22 may be organized into a number of intermediate levels or layers of nodes between the L1 nodes and the queues. In some instances, hierarchical scheduling data structure 22 includes, as one example, L2 nodes that are each representative of a different virtual local area network (VLANs) that can be used to partition a given L1 nodes stream between different VLANs. In this instance, hierarchical scheduling data structure 22 includes layer 3 (L3) nodes representative of the customers that depend from the L2 VLAN nodes, thereby further segmenting the portions of the stream assigned to the VLAN by customers. Consequently, as the number of layers in hierarchical scheduling data structure 22 increases so too does the granularity with which streams represented by L1 nodes may be divided and provisioned to customers represented by L2 nodes in the example of FIG. 1.

After provisioning a L2 node for the new customer, admin 19 continues to interface with the same or a different user interface presented by UI module 20 to select one or more of the queues shown in the example of FIG. 1. Admin 19 provisions hierarchical scheduling data structure 22 to associate the selected queues with the previously selected L2 node that represents the new customer. Similar to both L1 and L2 nodes, there are often a set number of queues available for association with the L2 nodes. For purposes of illustration it is assumed that there are 2048 (2K) queues that can be represented by a 2048-bit array. Admin 19 therefore selects one or more of the 2048 queues that are not currently assigned to a customer and assigns these selected queues to the previously selected L2 node representative of the new customer.

Admin 19 also associates a priority with each of the queues that defines a relative scheduling priority with respect to packets enqueued to each of the respective queues. Typically, there are five priorities, which are referred to as "guaranteed high" ($G_H$), "guaranteed medium" ($G_M$), "guaranteed low" ($G_L$), "excessive high" ($E_H$) and "excessive low" ($E_L$). In one example, the priorities can be classified to two classes, a guarantee class of priorities ($G_H$, $G_M$, $G_L$) and an excess class of priorities ($E_H$, $E_L$). The guarantee class of priorities include priorities that assure a certain order of scheduling, where queues assigned a guarantee high priority are serviced first, followed by those queues assigned a guarantee medium priority, and then those queues assigned a guarantee low priority are serviced after the guarantee medium priority queues are serviced. Queues assigned to one of the excess class of priorities are serviced only after the queues assigned one of the guarantee class of priorities, hence the name "excess" in that these queues store excess data of relatively low priority.

To illustrate selection of queues and assignment of priorities to these selected queues, consider the VoIP service of the triple-play package to which the new customer subscribed. VoIP services in general do not tolerate latency as latency results in audible pauses and breaks in telephone conversations that are not desirable. Admin 19 therefore selects one of a set number of queues currently not assigned to a customer and assigns this one of the queues to the previously selected L2 node representative of the new customer. Admin 19 designates this queue for use by the new customer's VoIP service and assigns this queue the guaranteed high scheduling priority, which assures the highest scheduling priority for packets stored to this queue thereby reducing latency. Admin 19 also selects another queue for the video service of the new customer's triple-play package and assigns this queue a guaranteed medium scheduling priority as video services in general are more tolerant of latency (which is mostly due to the ability to buffer video data). Admin 19 then selects another queue for the Internet data service and assigns this queue a scheduling priority of guaranteed low, as Internet data services generally tolerate latency much better than either VoIP or video services. Admin 19 may also designate overflow queues for excess traffic and associate these queues with excessive high and excessive low scheduling priorities.

In response to the above noted input entered by admin 19 via one or more interfaces presented by UI module 20 to provision hierarchical scheduling data structure 22, packet scheduler 18 provisions hierarchical scheduling data structure 22 by storing configuration data to hierarchical scheduling data structure 22 that define the associations between the various selected nodes and queues. With respect to the newly provisioned L1 node, this configuration data indicates, for example, that the newly provisioned L2 node depends from the newly provisioned L1 node. With respect to the newly provisioned L2 node, the configuration data indicates which of the queues is associated with the newly provisioned L2 node. The configuration data also indicates the priorities assigned to the newly provisioned queues. Often, this configuration data is defined as an array that indicates these children nodes as valid children nodes.

After provisioning hierarchical scheduling data structure 22 in this manner, the new customer accesses the services to which the new customer has subscribed. One of interfaces 14 of router 10 then receives incoming packets 16 from various customer devices, such as a VoIP telephone (for the VoIP service), a set-top box (for the video service), and a device capable of accessing the Internet data service (e.g., a personal computer, a laptop, a workstation, a video game console, a cellular phone, a so-called "smart phone," a personal digital assistant (PDA), a desktop computer, and an electronic reader (e-reader) device). This one of interfaces 14A forward incoming packets 16A from this customer to packet scheduler 18 of control unit 12.

Packet scheduler 18 includes an enqueue module 26 that enqueues these incoming packets 14A to the appropriate one of the queues of hierarchical scheduling data structure 22. Enqueue module 26 represents a hardware module, which in some instances executes software, to classify packets as belonging first to a new customer and next to a particular service to which the determined customer has subscribed. In this instance, enqueue module 26 classifies incoming packets 16A as originating from the new customer by examining what is referred to as the "five-tuple" defined in the header of each of packets 16A. The term "five-tuple" is a moniker for the IP source address, the IP destination address, the IP source port, the IP destination port, and the protocol. Particularly, for traffic received from those devices associated with the new customer, enqueue module 26 examines the source address of the five-tuple to determine to the one of the customers to which each of incoming packets 16A belongs. Enqueue module 26 also examines the protocol defined in the five-tuple to identify the particular service to which the data in the payload of each of incoming packets 16A corresponds. Enqueue module 26, for example, determines that one of incoming packets 16A stores data defining an source address associated with the new customer and a protocol associated with the VoIP service. Enqueue module 26 then stores this one of incoming packets 16A to the appropriate one of the queues associated with the L2 node of the customer and assigned the $G_H$ scheduling priority.

Generally, enqueue module 26 stores incoming packets 16A to the appropriate one of the queues of the hierarchical scheduling data structure 22 as one or more discrete data units referred to as "chunks." A chunk typically represents a 128-byte portion of a packet. Enqueue module 26 segments each of incoming packets 16A into one or more of these so-called "chunks" and stores the chunks corresponding to each of packets 16A to the queues of hierarchical scheduling data structure 22. Packet scheduler 18 therefore operates at a chunk-level to schedule packets. Consequently, packet scheduler 18 may be referred to as a packet determinate chunk-based scheduler because it schedules processing of an entire packet but enqueues, dequeues and otherwise operates on chunks of the packet in order to schedule the packet, as described below in more detail.

Packet scheduler 18 also includes a ticker module 28 that represents a hardware module, which in some instances also executes software, to update the L1 and L2 masks to install and remove various nodes of hierarchical scheduling data structure. Ticker module 28 executes in conjunction with enqueue module 26 such that, in some instances, ticker module 28 executes in a manner that overlaps enqueue module 26. This type of execution may be referred to herein as concurrent execution in that at some point both of ticker module 28 and enqueue module 26 execute at the same time. The phrase "concurrent execution" should not be construed to mean strict simultaneous execution where both ticker module 28 and enqueue module 26 both start and stop execution at substantially the same time. The use of the phrase "concurrent execution" in this disclosure only signifies overlapping execution where one of modules 26, 28 may start and stop before the other starts and stops execution respectively.

Ticker module 28 is usually responsible for rate shaping and defines what is referred to as a "credit" for at least the queues and possible one or more of the nodes in hierarchical scheduling data structure 22. A credit is representative of an increment of bandwidth. As noted above, the L1 nodes each define a particular allocation of bandwidth of a physical interface that is referred to as a stream. Ticker module 28 maintains this allocation of bandwidth by allocating credits to each L1 and L2 node as well as each queue, where each credit for example represents a certain amount of the bandwidth. Admin 19 defines the bandwidth allocation. Some of these allocations are static such as those assigned to the VoIP and video services, as these services generally require a certain amount of bandwidth to provide an adequate service to the customer. Other allocations are more dynamic such as those assigned to the Internet data service, as service providers often offer different levels or classes of Internet data service. For example, one service provider may offer a 756 kilobyte (Kb)/s Internet data service, a 1.5 megabyte (Mb)/s Internet data service, a 5 Mb/s Internet data service and a 7 Mb/s Internet data service. The customer then selects one of these various levels or classes of Internet data service, whereupon admin 19 provisions this class of service by instructing ticker module 28 to assign more or less credits to the queue associated with the Internet data service.

As the queues are serviced, e.g., chunks corresponding to packets are dequeued, arranged back into the packets, and forwarded as outgoing packets 16B, ticker module 28 assesses the number of credits assigned to these queues (and possibly from various ones of L2 and L1 nodes). If the number of credits assigned to the queue (or possibly the various ones of L2 and L1 nodes) is less than a minimum number of credits, ticker module 28 updates the L1 and/or L2 arrays that identify valid children nodes to effectively remove the queue (and possibly the various ones of the L2 and L1 nodes) from being serviced. Ticker module 28 may also periodically updates the credit count by a static number of credits to routinely allocate the queues (and possibly the L1 and L2 nodes) an agreed upon amount of bandwidth. If the allocation of credits is sufficient to support servicing of a previously removed queue, ticker module 28 then updates the array identifying valid children nodes to add these queues (or possibly a L1 or L2 node) back for consideration by other operations when it is determined that this queue has not received an agreed to minimum amount of bandwidth. In this respect, ticker module 28 is responsible for shaping the bandwidth delivered to a particular stream, customer and queue so that minimum and maximum levels of bandwidth to which the customer subscribed is met.

Packet scheduler 18 also includes a back pressure (BP) module 30 ("BP module 30") that represents a hardware module, which in some instances executes software, to coordinate scheduling between two or more packet schedulers 18. That is, in some instances, control unit 12 executes two or more packet schedulers 18. To illustrate, control unit 12 may execute a first packet scheduler for scheduling outgoing traffic and a second packet scheduler for scheduling incoming traffic. These schedulers may communicate with one another via BP modules 30 to coordinate packet scheduling and avoid multiple scheduler conflicts. Packet scheduler 18 typically executes BP module 30 concurrently to ticker module 28 and enqueue module 26.

Packet scheduler 18 also includes dequeue module 32. Dequeue module 32 represents a hardware module, which in some instances executes software, to service the queues of hierarchical scheduling data structure. Dequeue module 32 services the queues in accordance with the scheduling priorities associated with the queues. To select the appropriate one of the queues to service, dequeue module 32 traverses hierarchical scheduling data structure 22. To improve packet scheduling throughput, dequeue module 32 implements a first dequeue (DQ) operation 34A ("DQ op 34A") and a second DQ operation 34B ("DQ op 34B"). Each of dequeue operations 34A, 34B ("dequeue operations 34") respectively traverse hierarchical scheduling data structure 22 to select an appropriate one of the queues from which to dequeue a chunk. DQ operations 34 may continue to service the same queue and dequeue chunks for any given packet until all the chunks for any given packet are dequeued. DQ operations 34 may then select the next queue and dequeue the chunks for any given packet until all of the chunks for that packet have been scheduled. After dequeuing the packets, packet scheduler 18 forward that packet as one of outgoing packets 16B. In this respect again, packet scheduler 18 operates at the chunk-level to dequeue all of the chunks for any given packet. Once again, for this reason, packet scheduler 18 represents a packet determinate chunk-based scheduler that schedules entire packets for processing using a chunk-based approach.

In one example, dequeue module 32 utilizes a pipelined, multi-threaded dequeue operation in conjunction with the priority-based queuing mechanism maintained by hierarchical scheduling data structure 22. For example, dequeue module 32 may be organized in a pipelined hardware structure having a number of different stages of execution, where each of dequeue operations 34 represent hardware threads being concurrently executed by the different stages of the pipeline hardware structure. In some cases, the number of clock cycles for completion of a single chunk dequeue operation 34A can exceed the required packet processing line rate of the device. For example, dequeue operations 34 may require approximately 11 clock cycles to traverse hierarchical scheduling data structure 22 to select one of the queues, remove a chunk stored to the selected one of the queues and update scheduling data 24 to reflect servicing the selected one of the queues. However, bandwidth requirements or packet servicing line rate throughput may require dequeuing chunks at higher rate, e.g., every 6 clock cycles. To illustrate, dequeue module 32 initiates dequeue operation 34A at a clock cycle N. After six clock cycles, dequeue module 32 then initiates a dequeue operation 34B at a clock cycle numbered N+6, which is pipelined and executed concurrently at least in part with dequeue operation 34A. In this way, dequeue module 32 services chunks stored to queues once every six cycles rather than servicing chunks once every 11 cycles, as would be the case in linear execution of a single dequeue operation.

Dequeue module 32 performs pipelined dequeuing operations concurrently to BP module 30, ticker module 28 and enqueue module 26. Each of these modules 26-32 may represent one or more hardware threads being concurrently executed by a number of pipelined hardware modules, which are represented collectively as packet scheduler 18. Continuing the example above, enqueue module 26, ticker module 28 and BP module 30 may execute to completion every six cycles. In this example, enqueue module 26 therefore traverses hierarchical scheduling data structure 22 to enqueue a chunk of any given packet to one of the queues, as well as, updates scheduling data 24 to update credits and other information once every six cycles. Ticker module 28 allocates the static number of credits and adds and removes queues (and possibly L1 and L2 nodes) once every six cycles. BP module 30 coordinates scheduling with another packet scheduler once every six cycles. In this example, dequeue module 32 executes dequeue operations 34 once every six cycles to traverse hierarchical scheduling data structure 22 in order to select an appropriate one of the queues, dequeue a chunk from the selected queue and update scheduling data 24 (including the credit counts).

Considering the concurrent manner in which packet scheduler 18 operates and the complexity of the highly granular prioritized scheduling enabled by hierarchical scheduling data structure 22, it can be difficult to "conserve work" within packet scheduler 18. The phrase "work conserving" is used herein to refer to a measure of those hardware threads (e.g., execution cycles) of the total number of hardware threads that are executed that actually produce a useful result or perform work (e.g., dequeuing or enqueuing a chunk). The measure is often described as a percentage, where a 100% work conserving packet scheduler, for example, always executes operations that perform work as opposed to a 90% work conserving packet scheduler where one out of 10 operations do not perform any useful work, such as dequeue a chunk.

In accordance with the efficient packet scheduling techniques described in this disclosure, packet scheduler 18 promotes work conservation by storing scheduling data 24 for each node in hierarchical scheduling data structure 22. Scheduling data 24 includes L1 data 24A, L2 data 24B and queue data 24C that defines, for each of the hierarchically-ordered nodes, either a child count or an aggregate queue depth. For example, L1 data 24A stores data defining a L1 child count that indicates how many L1 children nodes subtending from the root node provide access to a queue that contains one or more packets. L2 data 24A, as another example, stores data defining a L2 child count that indicates how many L2 children nodes subtending from each of the L1 nodes provide access to a queue that contains one or more packets. Queue data 24C, as yet another example, stores data defining a queue depth for those queues subtending from each of the L2 nodes. The term "queue depth" refers to a number of chunks currently stored to those queues accessible from the respective one of the nodes. In contrast, the term "queue capacity" is used in this disclosure to refer to the total number of chunks any given one of the queues is capable of storing. In this respect, the queue depths may be referred to as current queue depths to distinguish from the use of the term "queue depth" to indicate the total capacity of the queue.

To illustrate, consider an L1 node denoted as $N_1$ from which first and second L2 nodes denoted as $N_{2A}$ and $N_{2B}$ depends. Further consider that a first, second and third queue denoted as $Q_1$, $Q_2$, $Q_3$, respectively, depend from $L_{2A}$ and a fourth queue denoted as $Q_4$ depend from $N_{2B}$. $Q_1$ is assigned scheduling priorities of $G_H$, while $Q_2$ is assigned a scheduling priority of $G_M$ and $Q_3$ and $Q_4$ is assigned a scheduling priority of $G_L$. Moreover, assume that $Q_1$ stores one or more chunks representative of a single packet denoted $P_{Q1}$, $Q_2$ stores a one or more chunks representative of a single packet denoted $P_{Q2}$, $Q_3$ stores one or more chunks representative of a packet $P_{Q3}$ and $Q_4$ stores one or more chunks representative of a single packet $P_{Q4}$. In this example, packet scheduler 18 initially stores L1 data 24A defining a child count of two for node $N_1$ to indicate that two nodes that depend from node $N_1$ (i.e., nodes $N_{2A}$ and $N_{2B}$ in this example) each provide access to queues $Q_1$, $Q_2$, $Q_3$, $Q_4$ that store at least one chunk. Packet scheduler 18 also stores L2 data 24B defining a child count of three for node $N_{2A}$ as node $N_{2A}$ provides access to three queues $Q_1$, $Q_2$, $Q_3$, that each store at least one packet. L2 data 24B also defines another child count of one for node $N_{2B}$ as node $N_{2B}$ provides access to a single queue $Q_4$ that stores at least one chunk. Packet scheduler 18 may also queue data 24C defining queue depths for each respective one of the queues that each indicate the number of chunks currently stored by each of the queues.

Moreover, in some instances, packet scheduler 18 stores a separate child count for each of the nodes $N_1$, $N_{2A}$, $N_{2B}$ in L1 data 24A and L2 data 24B that indicates the child count in terms of priority. Returning to the example above, in this instance, packet scheduler 18 stores L1 data 24A defining a first guaranteed high child count of one for $N_1$ indicating that one of the nodes $N_{2A}$ and $N_{2B}$ (i.e., node $N_{2A}$ in this example) provides access to one of queues $Q_1$, $Q_2$, $Q_3$, $Q_4$ associated with a $G_H$ scheduling priority (i.e., queue $Q_1$ in this example) store at least one chunk. Packet scheduler 18 also stores L1 data 24A defining a second guaranteed medium child count of one for node $N_1$ indicating that one of the nodes $N_{2A}$ and $N_{2B}$ (i.e., node $N_{2A}$ in this example) provides access to one of queues $Q_1$, $Q_2$, $Q_3$, $Q_4$ associated with a $G_M$ scheduling priority (i.e., queue $Q_2$ in this example) store at least one chunk. Packet scheduler 18 further stores L1 data 24A defining a third guaranteed low child count of two for node $N_1$ indicating that both of nodes $N_{2A}$ and $N_{2B}$ provides access to queues $Q_1$, $Q_2$, $Q_3$, $Q_4$ associated with a $G_L$ scheduling priority (i.e., queues $Q_3$ and $Q_4$ in this example) store at least one chunk. Packet scheduler 18 moreover stores a fourth and fifth child count for node $N_1$ indicating that one of nodes N2A and N2B provide access to one of queues $Q_1$, $Q_2$, $Q_3$, $Q_4$ associated with $E_H$ and $E_L$ scheduling priorities stores at least one packet, where each of these respective child counts are equal to zero in this example because there are no queues with these scheduling priorities.

Packet scheduler 18 also stores L2 data 24B defining these priority-specific child counts for nodes $N_{2A}$, $N_{2B}$ in a manner similar to that described above with respect to node $N_1$. To illustrate, packet scheduler 18 stores L2 data 24B defining a first guaranteed high child count of one for $N_{2A}$ indicating that one of queues $Q_1$, $Q_2$, $Q_3$ is associated with a $G_H$ scheduling priority and stores at least one chunk. Packet scheduler 18 also stores L2 data 24B defining a second guaranteed medium child count of one for $N_{2A}$ indicating that one of queues $Q_1$, $Q_2$, $Q_3$ accessible from node $N_{2A}$ is associated with a $G_M$ scheduling priority and stores at least one chunk. Packet scheduler 18 also stores L2 data 24B defining a third guaranteed medium child count for node $N_{2A}$ indicating that one of queues $Q_1$, $Q_2$, $Q_3$ accessible from node $N_{2A}$ is associated with a $G_L$ scheduling priority and stores at least one chunk. Packet scheduler 18 moreover stores a fourth and fifth child counts of zero for node $N_{2A}$ indicating that none of queues $Q_1$, $Q_2$, $Q_3$ accessible from node $N_{2A}$ is associated with $E_H$ and $E_L$ scheduling priorities and stores at least one chunk. For node $N_{2B}$, packet scheduler 18 stores the respective priority-specific child counts to L2 data 24B, each one of which equals zero except for the guaranteed low child count, which is set to one because $Q_4$ depends from node $N_{2B}$ and stores at least one chunk corresponding to packet $P_{Q4}$.

Packet scheduler 18 then employs dequeue module 32 to service the queues of hierarchical scheduling data structure 22. Dequeue module 32 initiates dequeue operations 34A, which proceeds to schedule delivery of a chunk corresponding to a packet stored to one of the queues based on this child count scheduling data. With respect to the above example, dequeue operation 34A first traverses root node of hierarchical scheduling data structure 22, which is denoted as $N_R$ for purposes of example. Dequeue operation 34A traverses node $N_R$ to select one of the L1 nodes.

To select one of the L1 nodes, dequeue operation 34A retrieves the above noted L1 array of bits that identify those of the L1 nodes that depend from root node $N_R$. Dequeue operation 34A then retrieves and applies one or more masks associated with root node $N_R$ that identify those of the L1 nodes that depend from root node $N_R$ that are currently available. That is, each node of hierarchical scheduling data structure 22 defines a separate list, which in this instance is represented as separate masks maintained by ticker module 28, for each of the five priority levels. Each mask, as noted above, identifies nodes having active traffic at the corresponding priority level that depend from the respective node that stores or otherwise maintains the mask. For node $N_R$, the guarantee high mask identifies node $N_1$ as having traffic associated with the $G_H$ scheduling priority, the guarantee medium mask identifies $N_1$ as having traffic associated with the $G_M$ scheduling priority, the guarantee low mask identifies $N_1$ as having traffic associated with the $G_L$ scheduling priority, and the excess high and excess low maps do not identify any nodes.

Each node also includes data that defines a pointer. This pointer identifies the last node serviced by a subsequent dequeue operation. In this example, considering that only one L1 node is available, i.e., $N_1$, dequeue operation 34A applies the guarantee high mask to the root node $N_R$ bit array identifying those of the L1 nodes that depend from root node $N_R$, where the guarantee high mask does not mask node $N_1$ and retrieves the root node pointer identifying the last node serviced by a subsequent dequeue operation. Dequeue operation 34A then selects the next node identified by the guarantee high masked array, where in this example dequeue operation 34A selects node $N_1$ as there is only one node $N_1$ that depends from root node $N_R$.

After selecting node $N_1$, dequeue operation 34A repeats the process outlined above with respect to selected L1 node $N_1$ to select one of the L2 nodes that depend from node $N_1$. To continue the example, dequeue operation 34A retrieves the array of bits identifying those of the L2 nodes that depend from node $N_1$ as well as the guarantee high mask associated with node $N_1$. Considering that L2 node $N_{2A}$ provides access to a queue $Q_1$ associated with a guarantee high scheduling priority, upon applying the guarantee high mask to the array, dequeue operation 34A determines that L2 node $N_{2A}$ provides access to a queue $Q_1$ that stores at least one chunk having a scheduling priority of guarantee high. Dequeue operation 34A retrieves the pointer associated with node $N_1$ in order to select the next available guarantee high queue. Considering that only node $N_{2A}$ provides access to a queue associated with a scheduling priority of guarantee high, dequeue operation 34A selects L2 node $N_{2A}$.

Dequeue operation 34A repeats the above process with respect to selected node $N_{2A}$ to select one of the queues. In this manner, dequeue operation 34A selects queue $Q_1$ by retrieving the array of bits identifying valid queues that depend from node $N_{2A}$, applying the guarantee high mask stored by node $N_{2A}$ to the retrieved array, and selecting the next guarantee high queue based on a pointer retrieved from node $N_{2A}$. After selecting queue $Q_1$, dequeue operation 34A retrieves the queue depth associated with queue $Q_1$ from queue data 24C, the child count associated with selected L2 node $N_{2A}$ from L2 data 24B and the child count associated with selected L1 node $N_1$ from L1 data 24A.

Dequeue operation 34A reads or otherwise retrieves the $Q_1$ queue depth so as to update the guarantee high mask associated with root node $N_R$ based on the queue depth. Dequeue operation 34A updates this mask if the queue depth will be equal to zero after dequeue operation 34A has removed the last chunk stored to selected queue $Q_1$. Assuming $Q_1$ stores only a single chunk for packet $P_{Q1}$, dequeue operation 34A determines by comparing the $Q_1$ queue depth to the value of one that dequeue operation 34A will dequeue the last chunk stored to $Q_1$. Based on this determination, dequeue operation 34A updates the guarantee high mask associated with root node $N_R$ to mask $N_1$ from consideration by subsequent dequeue operations.

While ticker module 28 normally updates the array identifying valid child nodes approximately every six clock cycles, ticker module 28 can only update the array to remove various nodes after the last chunk stored to the queue has been dequeued. Yet, when multiple dequeue operations 34 are executed in this overlapping or concurrent manner, a second dequeue operation 34B may begin traversing hierarchical scheduling data structure 22 before first dequeue operation 34A has dequeued the last chunk stored to the queue $Q_1$ associated with the guarantee high scheduling priority. As the last chunk for this packet $P_{Q1}$ has not yet been dequeued from queue $Q_1$ and ticker module 28 is unaware that first dequeue operation 34A is in the processes of dequeuing this last chunk corresponding to packet $P_{Q1}$, ticker module 28 has not updated the guarantee high array associated with node $N_R$ that identifies valid children nodes. Consequently, dequeue operation 34A updates the mask in certain instances, such as the example above, to mask node $N_1$ from further consideration by subsequent dequeue operation 34B in terms of the guarantee high scheduling priority, thereby avoiding a potential scheduling conflict.

To illustrate with respect to the above example, dequeue operation 34A updates the guarantee high mask associated with root node $N_R$ to mask node $N_1$ from the guarantee high scheduling perspective just prior to the execution of dequeue operation 34B by dequeue module 32. Once dequeue operation 34B is executed, dequeue operation 34B repeats the process outlined above to traverse hierarchical scheduling data structure 22. Briefly, dequeue operation 34B retrieves the array of nodes that depend from root node $N_R$ and the guarantee high mask associated with root node $N_R$, which dequeue operation 34A just updated in the earlier cycle. Applying this mask to the array, dequeue operation 34B determines that none of the L1 nodes provide access to a queue associated with a guarantee high scheduling priority. Dequeue operation 34B then applies the guarantee medium mask to the array with the result of identifying L1 node $N_1$ as providing access to a queue (i.e., queue $Q_2$ in this example) associated with a guarantee medium scheduling priority that stores at least one chunk. Dequeue operation 34B continues in this manner to dequeue this chunk from queue $Q_2$.

As a result of updating this mask in accordance with the techniques of this disclosure, dequeue operation 34A promotes work conservation. Consider an instance where dequeue operation 34A does not update this mask in this manner and instead continues to traverse hierarchical scheduling data structure 22. While executing first dequeue operation 34A, dequeue module 32 invokes second dequeue operation 34B, which proceeds to traverse hierarchical scheduling data structure 22 to select an appropriate one of the queues in a manner similar to that described above with respect to dequeue operation 34A. Dequeue operation 34B first applies the guaranteed high mask, which would not have yet been updated by ticker module 28 as dequeue operation 34A has yet to dequeue the last chunk corresponding to packet $P_{Q1}$ from queue $Q_1$, to the array of bits and notes that only one L1 node, node $N_1$ in the example above, is available and stores at least one chunk.

Dequeue operation 34B would have selected node $N_1$ despite that the queue accessible form node $N_1$ assigned a scheduling priority of $G_H$ only stores a single chunk corresponding to packet $P_{Q1}$. Consequently, both of dequeue operations 34 would have selected to dequeue the only chunk associated with packet $P_{Q1}$ stored to queue $Q_1$, which would have resulted in a scheduling conflict, as second dequeue operation 34B would have reached queue $Q_1$ only to determine that node $Q_1$ no longer stores any chunks, as the last chunk corresponding to packet $P_{Q1}$ would have been previously dequeued by preceding dequeue operation 34A. Second dequeue operation 34B would have performed no work and would, as a result, have wasted processing resources and inserted a chunk-sized "bubble" or void in the stream of outgoing packets 34B.

However, by masking the selected one of the plurality of hierarchically-ordered nodes in accordance with the techniques described above, dequeue operation 34A effectively removes node $N_1$ such that second dequeue operation 34B executing concurrent to dequeue operation 34A does not consider node $N_1$, at least with respect to scheduling chunks of packets stored to queues assigned a $G_H$ scheduling priority, when traversing the hierarchical scheduling data structure 22 to schedule delivery of a chunk corresponding to a second packet stored to one of the queues. Instead, dequeue operation 34B applies the guaranteed high mask associated with the root node and previously updated by dequeue operation 34A to mask node $N_1$ from consideration and determines that none of the queues associated with the $G_H$ scheduling priority and accessible from available L1 nodes store any packets. Dequeue operation 34B then applies the guaranteed medium mask associated with the root node to the bitmask of the root node that maintains L1 dependencies to determine that a queue assigned a $G_M$ scheduling priority and associated with a single node $N_1$ stores a packet. Dequeue operation 34B selects node $N_1$ in order to dequeue a packet stored to a queue assigned a $G_M$ scheduling priority and accessible from node $N_1$.

In any event, dequeue operation 34A proceeds to dequeue the last chunk corresponding to packet $P_{Q1}$ stored to queue $Q_1$, while at some later time approximately 4 to 6 clock cycles after dequeue operation 34A dequeues the last chunk corresponding to packet $P_{Q1}$ in this example, dequeue operation 34B dequeues a chunk corresponding to packet $P_{Q2}$ stored to queue $Q_2$. Rather than attempt to dequeue the same chunk corresponding to packet $P_{Q1}$ as dequeue operation 34A, which leads to scheduling conflict and "bubble," subsequent dequeue operation 34B dequeues a chunk corresponding to packet $P_{Q2}$, thereby avoiding the scheduling conflict and the "bubble" in this instance. As dequeue operation 34B implements the techniques of this disclosure to ensure it performs work, the techniques described in this disclosure may promote work conservation and packet scheduler 18 may be considered to promote more efficient packet scheduling as a result.

Moreover, the L1 and L2 child counts stored to L1 data 24A and L2 data 24B are generally used to promote work conservation with respect to enqueue module 26, ticker module 28 and BP module 30. By storing these child counts, each of these modules 26-30 need not compute the child count by retrieving the arrays of valid children nodes and then determining the total count of valid children nodes identified by this array. By avoiding these operations, each of these modules 26-30 need only access and modify this count rather than have to compute these counts as they traverse hierarchical scheduling data structure 22, thereby promoting more efficient operation of packet scheduler 18 and enabling these modules 26-30 to complete their respective operations in the above noted 6-cycles. In other words, without these counts, packet scheduler 18 would have to occur additional clock cycles to compute these counts which may significantly detract from the amount of "work" that could be accomplished in a given amount of time. In this respect, these counts also facilitate work conservation with respect to the operations performed by modules 26-30. Dequeue operations 34A, 34B, as noted below, may update these counts so as to keep these counts synchronize with respect to the arrays as dequeue operations 34A, 34B update these arrays. In this respect, dequeue operations 34A, 34B contribute to the work conservation provided by these counts with respect to modules 26-30.

FIGS. 2A-2G are block diagrams illustrating one example of hierarchical scheduling data structure 22 and scheduling data 24 of FIG. 1 in more detail as pipelined dequeue operations 34 are executed concurrently by dequeue module 32. That is, FIGS. 2A-2G illustrate states of hierarchical scheduling data structure 22 and scheduling data 24 as traversed and updated by the pipelined dequeuing operations in accordance with the techniques of this disclosure.

Figure 2A:
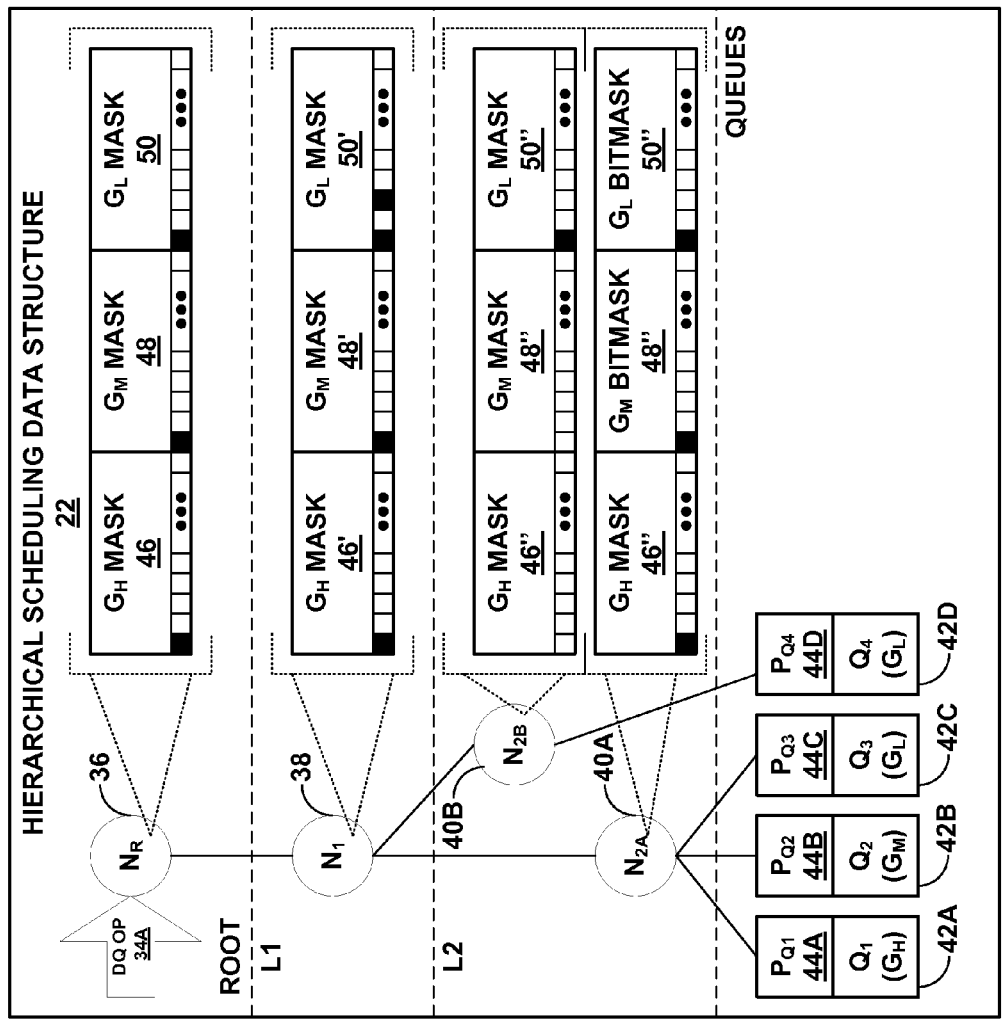
FIGS. 2A-2G are block diagrams illustrating one example of the hierarchical scheduling data structure and scheduling data of FIG. 1 in more detail as pipelined dequeue operations are executed concurrently by a dequeue module.
Figure 2A:
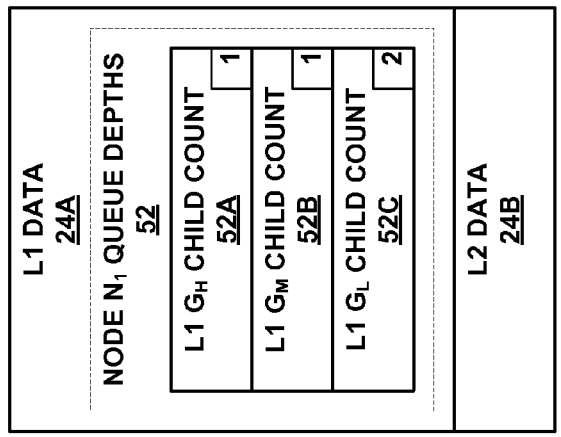

FIG. 2A is a block diagram illustrating example initial configuration of hierarchical scheduling data structure 22 that reflects the example noted above with respect to FIG. 1 and initial L1 data 24A of scheduling data 24. In the example above, a root node 36 denoted as $N_R$ is a parent node of a level 1 (L1) node 38 denoted $N_1$. L1 node 38 is a parent node of L2 nodes 40A, 40B ("L2 nodes 40") denoted $N_{2A}$, $N_{2B}$, respectively. L2 nodes 40 are often referred to as "leaf" nodes because these nodes represents leafs with respect to the "tree" analogy in contrast to the "root" node. Queues 42A-42C, which are denoted $Q_1$-$Q_3$, depend from node 40A, while queue 40D denoted $Q_4$ depends from node 40B. Queue 42A is assigned or associated with a scheduling priority of $G_H$ and stores a single chunk corresponding to packet 44A denoted $P_{Q1}$. Queue 42B is assigned or associated with a scheduling priority of $G_M$ and stores a single chunk associated with a packet 44B denoted $P_{Q2}$. Queue 42C is assigned or associated with a scheduling priority of $G_L$ and stores a single chunk associated with a packet 44C denoted $P_{Q3}$. Queue 42D is assigned or associated with a scheduling priority of $G_L$ and stores a single chunk associated with a packet 44D denoted $P_{Q4}$.

As shown in the example of FIG. 2A, root node 36 stores data defining a guaranteed high ($G_H$) mask 46 ("$G_H$ mask 46"), a guaranteed medium ($G_M$) mask 48 ("$G_M$ mask 48") and a guaranteed low ($G_L$) mask 50 ("$G_L$ mask 50"). Although not shown in FIG. 2A for ease of illustration purposes, node 36 also stores data defining an excess high ($E_H$) mask and an excess low ($E_L$) mask, as well as, the above noted array of bits indicating that L1 node 38 depends form root node 36. L1 node 38 also stores data defining similar masks 46'-50' to those of masks 46-50, although these masks 46'-50' may include additional bits considering that there may be more or less L2 nodes than L1 nodes that require additional or less bits in masks 46'-50'. L2 nodes 40 also store data defining similar masks 46"-50", which again may include more or less bits as there may be more or less queues than either L1 or L2 nodes that require more or less bits to represent in masks 46"-50".

L1 data 24A initially stores data defining a node $N_1$ child count 52, including an L1 $G_H$ child count 52A, an L1 $G_M$ child count 52B and an L1 $G_L$ child count 52C. Although not shown in the example of FIG. 2A for ease of illustration purposes, child counts 52 associated with node $N_1$ may also store data defining an L1 $E_H$ child count and an L1 $E_L$ queue depth. L1 $G_H$ child count 52A currently defines a queue depth of one to reflect that queue 42A, which is accessible from L1 node 38 and assigned a priority of $G_H$, stores a single chunk corresponding to packet 44A. L1 $G_M$ child count 52B also currently defines a queue depth of one to reflect that queue 42B, which is accessible from L1 node 38 and assigned a priority of $G_M$, stores a single chunk corresponding to packet 44B. L1 $G_L$ child count 52C currently defines a queue depth of two to reflect that each of queues 42C, 44D, which are both accessible from L1 node 38 and assigned a priority of $G_L$, respectively store a single chunk of packets 44C, 44D.

Initially, dequeue module 34 invokes a first dequeue operation 34A to traverse hierarchical scheduling data structure 22, as noted above. Dequeue operation 34A is denoted in the example of FIG. 2A as an arrow labeled "DQ OP 34A." Dequeue operation 34A begins traversing hierarchical scheduling data structure 22 at root node 36. Dequeue operation 34A retrieves the array and $G_H$ mask 46 and applies $G_H$ mask 46 to the array, which is not shown for ease of illustration purposes in the example of FIG. 2A. Dequeue operation 34A then retrieves a pointer associated with root node 36 and selects the next node from which a $G_H$ queue is accessible. The mask identifies L1 node 38 as depending from root node 36. $G_H$ mask 46 is shown in the example of FIG. 2A to include a solid black square, which represents a one in the mask and indicates that L1 node 38 is available. Applying $G_H$ mask 46 to the array, dequeue operation 34A determines that a single L1 node, i.e., L1 node 38, is available and provides access to a queue assigned a priority of $G_H$ that stores at least one chunk corresponding to a packet, i.e., queue 42A that stores a single chunk corresponding to packet 44A in the example of FIG. 2A. Given that only one L1 node depends from root node 36 and provides access to a queue with a scheduling priority of $G_H$, dequeue operation 34A selects L1 node 38 based on the pointer, as described above.

Dequeue operation 34A selects L1 node 38 and retrieves both the array associated with L1 node 38 that identifies those of L2 nodes 40 that depend from L1 node 38 and the mask associated with selected L1 node 38 of the same scheduling priority as that applied to select L1 node 38, i.e., $G_H$ mask 46'. Dequeue operation 34A repeats the process outlined above to select node $N_{2A}$ or L2 node 40A based on the pointer, where the pointer provides little help in this instance again because only one L2 node, i.e., node 40A in this example, provides access to a queue associated with a $G_H$ scheduling priority. However, in instances where two or more nodes provide access to different queues that are each associated with a $G_H$ scheduling priority, the pointer may be employed to select the next queue in a round-robin fashion. in any event, dequeue operation 34A then traverses to selected L1 node 38 of hierarchical scheduling data structure 22.

Figure 2B:
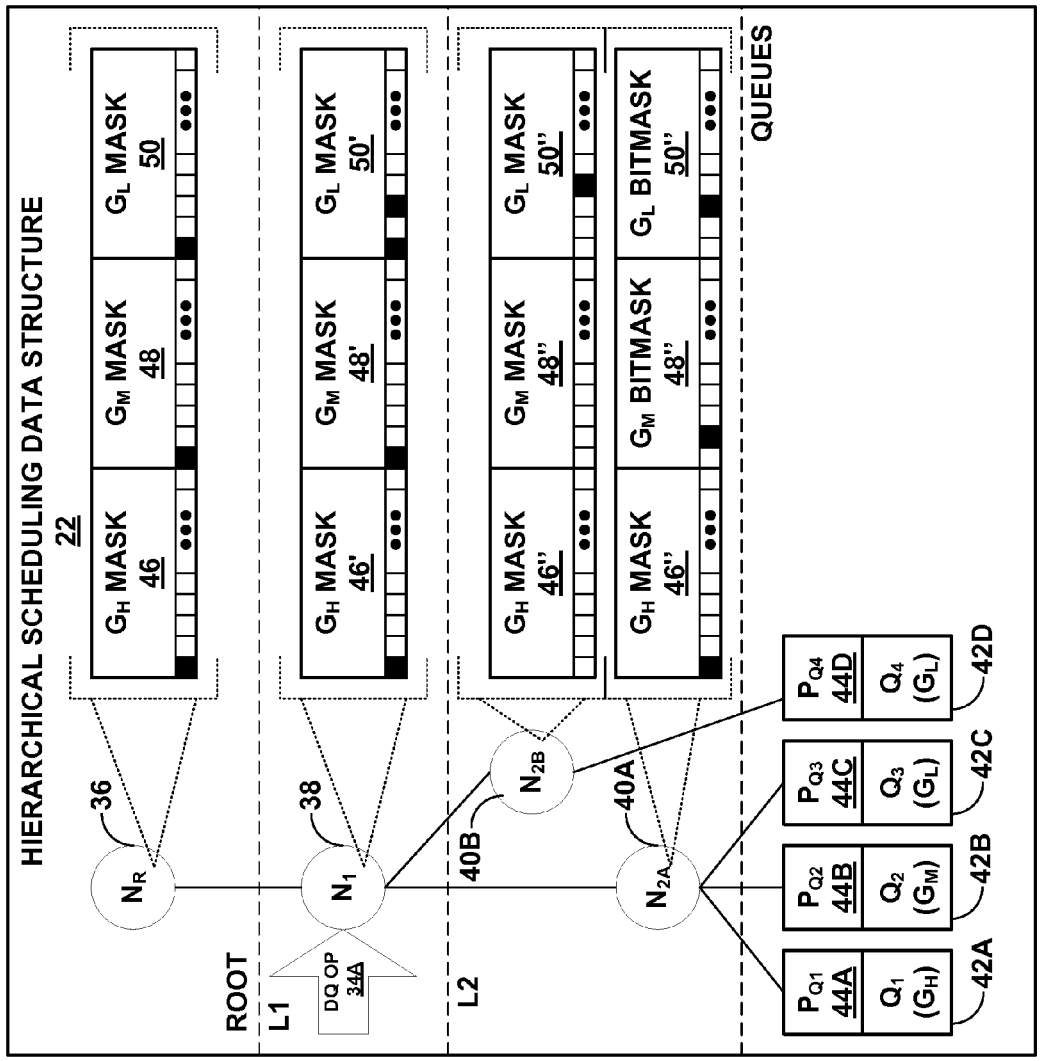
Figure 2B:
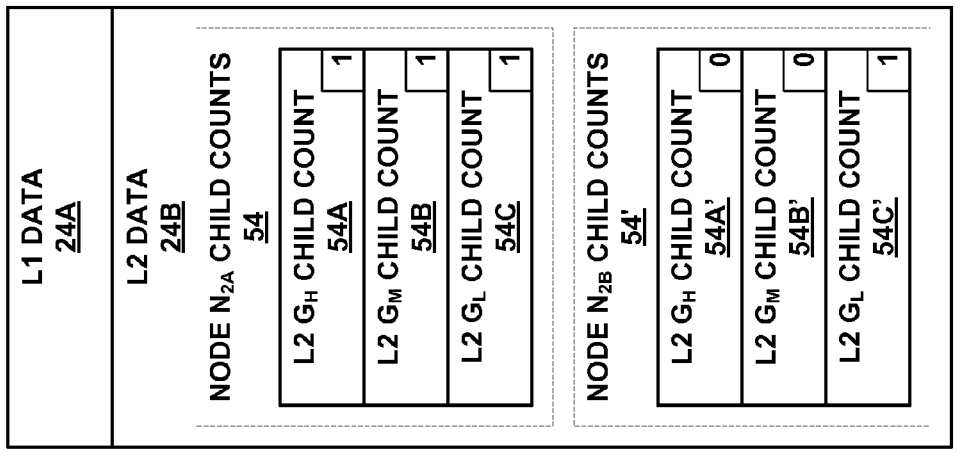

FIG. 2B is a block diagram illustrating exemplary operation of dequeue operation 34A in traversing L1 node 38 in accordance with the techniques of this disclosure. Dequeue operation 34A initially retrieves the configuration data associated with selected L1 node 38, which includes the array and masks 46'-50'. Dequeue operation 34A then applies the retrieved $G_H$ mask 46' to the array (which again is not shown in any of FIG. 2 for ease of illustration purposes) to determine which of L2 nodes 40 are available for servicing by dequeue operation 34A. Notably, $G_H$ mask 46' includes a single bit identifying that L2 node 40A provides access to an available queue of priority $G_H$ that stores at least one packet. Consequently, dequeue operation 34A selects node 40A.

However, for purposes of illustration, consider instances where more than one available L2 node dependent from $N_1$ included active traffic having a priority of $G_H$. In these instances, dequeue operation 34A may be configured to implement a strict packet round robin to select the next queue in a round robin manner. Dequeue operation 34A typically stores for each of masks 46-50, 46'-50' and 46"-50" a reference, i.e., the above noted pointer in the examples of this disclosure, to the previous or next queue in these instances to facilitate the round robin selection. Dequeue operation 34A also implements this strict packet round robin to select the next queue in instances where the guarantee medium and low lists indicate two or more available L2 nodes that depend from node 40 and that have active traffic of the respective priorities. If, contrary to the example above, the guarantee high list does not include any nodes (e.g., if ticker module 28 removed $Q_1$ because $Q_1$ has received its allotted bandwidth for the time being), dequeue operation 34A then considers the guarantee medium list of L2 nodes and performs the strict packet round robin selection for those nodes. Likewise, if the guarantee medium list does not include any available nodes, dequeue operation 34A then considers the guarantee low list of L2 nodes and performs the strict packet round robin. In a similar manner, dequeue operation 34A considers the excess high and excess low lists, but rather than apply a strict packet round robin, typically applies a weighted round robin algorithm to select from among multiple L2 nodes having active traffic at the respective scheduling priorities. Dequeue operation 34A performs this type of selection for each level of hierarchical scheduling data 22. Returning to the example of FIG. 2B, dequeue operation 34A selects L2 node 40A for the reasons noted above.

Figure 2C:
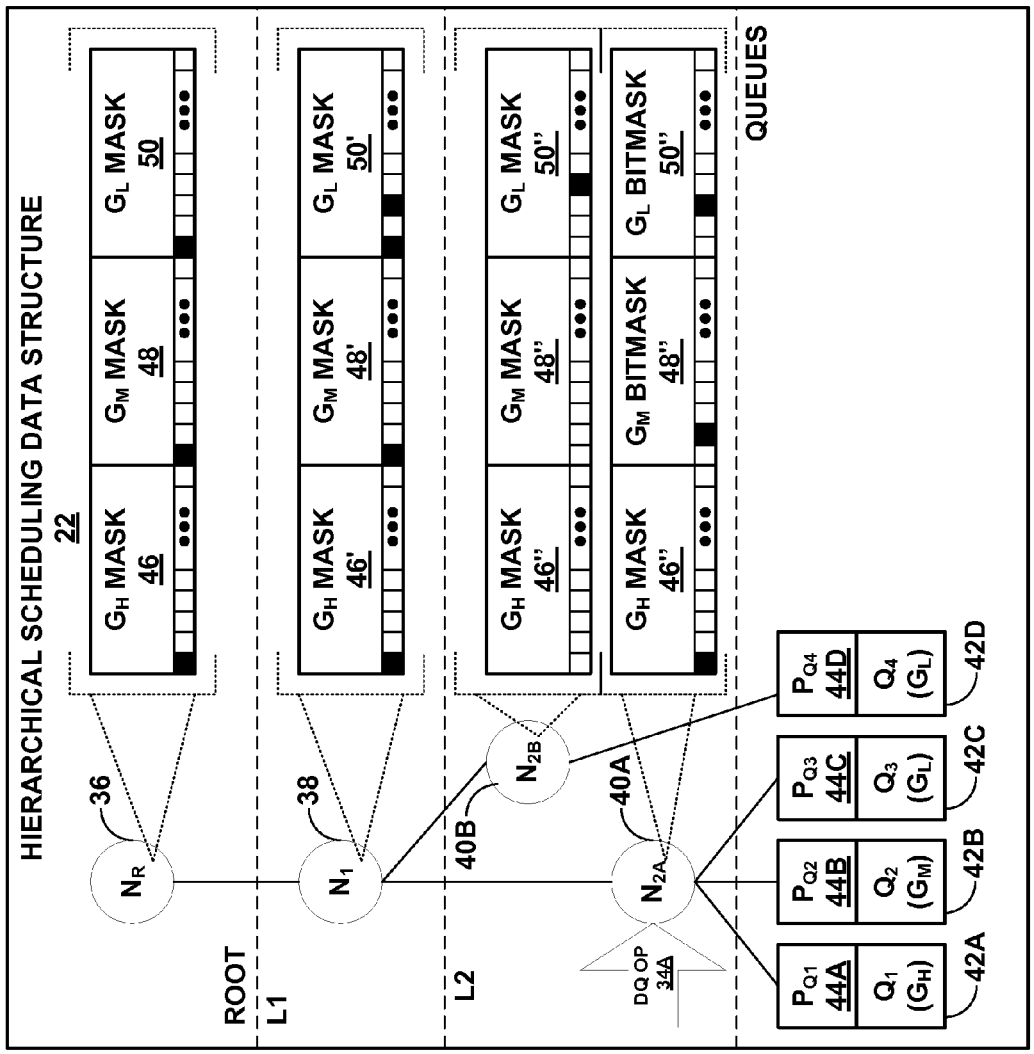

FIG. 2C is a block diagram illustrating exemplary operation of dequeue operation 34A in traversing L2 node 40A in accordance with the techniques of this disclosure. Dequeue operation 34A again performs the same procedure outlined above with respect to L2 node 40A to select one of queues 42A-42C that depend from L2 node 40A. To once again illustrate this process briefly, dequeue operation 34A retrieves the array, which again is not shown in the example of FIG. 2C, and the mask associated with L2 node 40A and the same priority as that previously applied to select L2 node 40A, i.e., $G_H$ mask 46". Dequeue operation 34A applies this mask 46" to the array and then utilizes the pointer to select from among queues 42A-42C that remain after applying mask 46". Again, in this limited example, only one queue 42A remains after applying mask 46" and dequeue operation 34A selects queue 42A. Dequeue operation 34A then read L1 $G_H$ child count 52A, L2 $G_H$ child count 54A and the queue depth stored for queue 42A in queue data 24C. If the queue depth indicates that queue 42A only stores a single chunk, dequeue operation 34A updates the mask associated with root node 36 and the scheduling priority of the queue dequeue operation 34A is currently servicing, i.e., $G_H$ mask 46 in this example, to mask or otherwise temporarily remove node N1 from consideration by subsequent dequeue operation 34B.

Figure 2D:
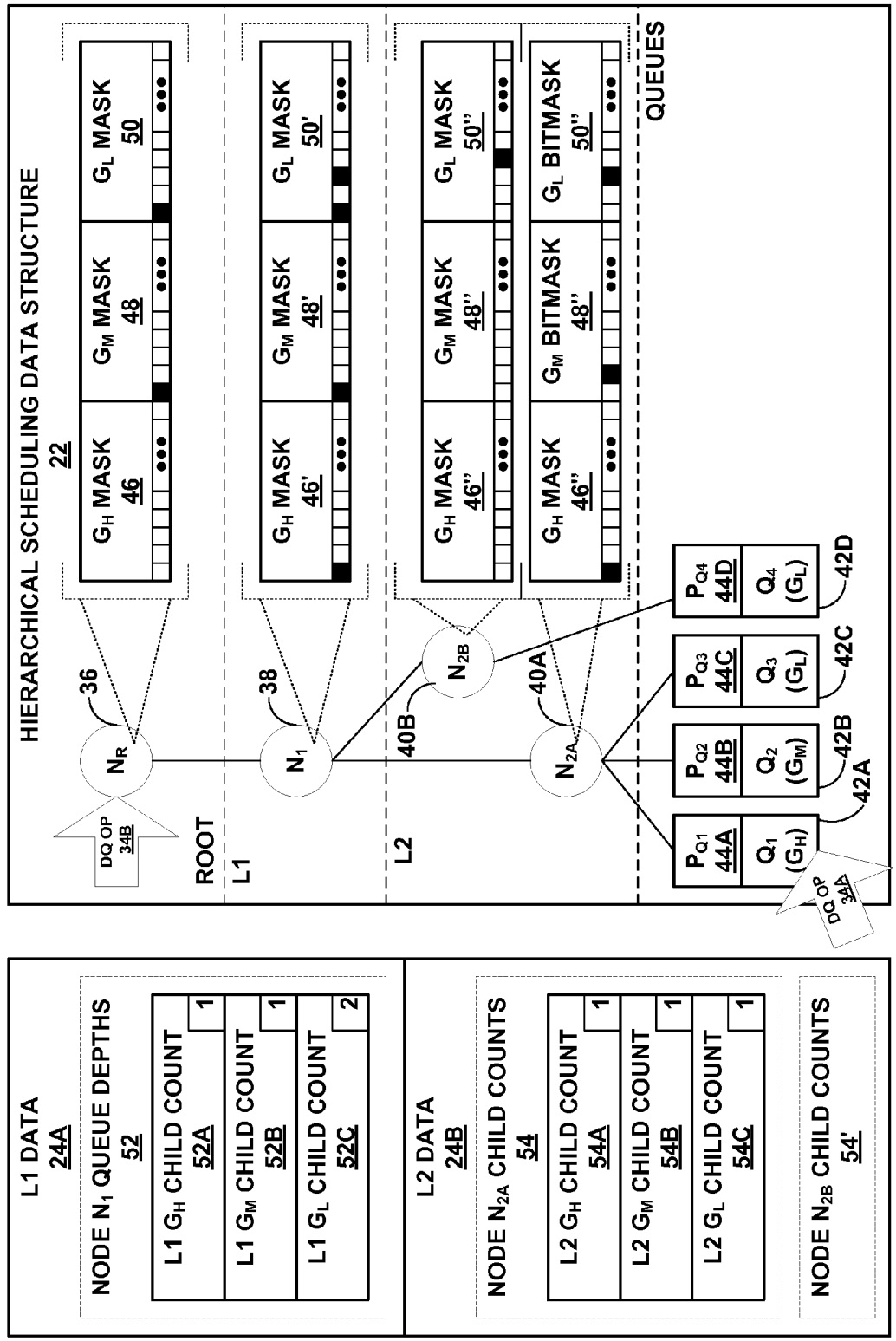

FIG. 2D is a block diagram illustrating hierarchical scheduling data structure 22 and scheduling data 24 after dequeue operations 34A traversed L2 node 40A. As shown in FIG. 2D, dequeue operation 34A has updated $G_H$ mask 46 to mask node 38 from consideration by immediately subsequent dequeue operation 34B by removing the one from $G_H$ mask 46. Dequeue operation 34B, which operates in substantially the same manner as that described above with respect to dequeue operation 34A, retrieves the array and $G_H$ mask 46, applying $G_H$ mask 46 to the array only to discover that none of the L1 nodes depending from root node 36 provide access to a queue associated with a scheduling priority of $G_H$. Consequently, dequeue operation 34B retrieves $G_M$ mask 48 and applies this mask 48 with the result that dequeue operation 34B determines that a single L1 node 38 depends from root node 36 and provides access to a queue associated with a scheduling priority of $G_M$. As a result, dequeue operation 34B selects L1 node 38.

Meanwhile, dequeue operation 34A has not yet dequeued packet 44A from selected queue 42A and, therefore, ticker module 28 may not update any of masks 46-50, 46'-50' and 46"-50". Yet, dequeue operation 34A updated mask 46 to avoid a potential scheduling conflict. Dequeue operation 34A continues to update masks one step ahead of subsequent dequeue operation 34B. To illustrate, dequeue operation 34A updates GH mask 46' associated with L1 node 38 to mask node 40A with respect to the $G_H$ scheduling priority prior to dequeue operation 34B traversing L1 node 38. Dequeue operation 34A determines that it needs to update this mask 46' in the same manner as that described above with respect to dequeue operation 34A updating mask 46. By updating both of $G_H$ mask 46 and $G_H$ mask 46' in accordance with the techniques of this disclosure, dequeue operation 34A effectively prevents, in this instance, subsequent dequeue operation 34B from traversing hierarchical scheduling data structure 22 to reach queue 42A only to find that the only chunk associated with this packet (i.e., packet 44A in this example) stored to queue 42A was previously dequeued by dequeue operation 34A.

Figure 2E:
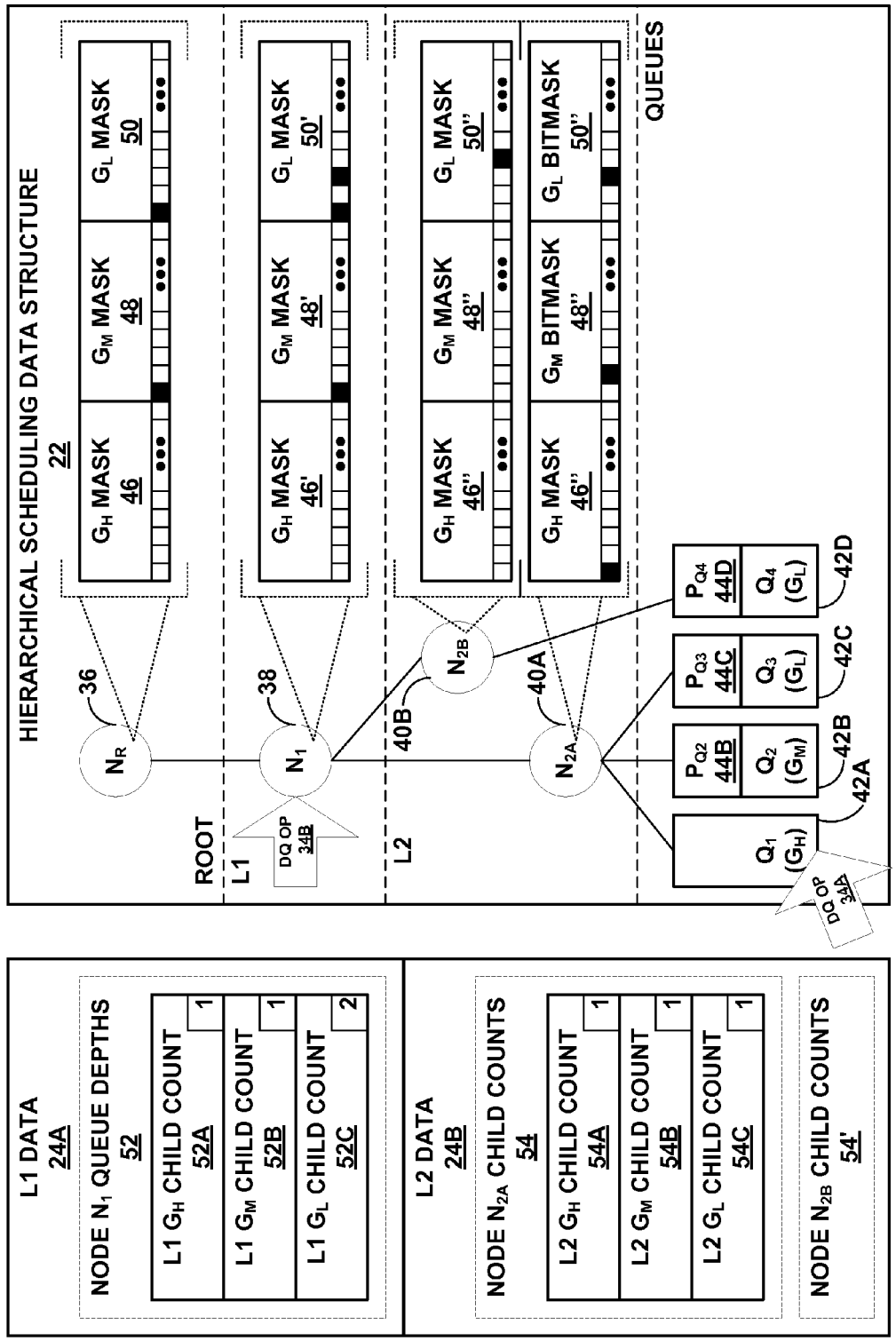

FIG. 2E is a block diagram illustrating hierarchical scheduling data structure 22 and scheduling data 24 after dequeue operations 34A, 34B have traversed queue 42A and root node 36, respectively. As shown in the example of FIG. 2E, dequeue operation 34A has updated $G_H$ mask 46' and dequeue operation 34B has traversed to L1 node 38. At this point, dequeue operation updates GH mask 46" to mask queue 42A from consideration by subsequent dequeue operation 34B in a manner similar to that described above with respect to updating masks 46 and 46'. Dequeue operation 34A continues to perform some additional operations required to service the last chunk corresponding to packet 44A and facilitate future servicing of chunks corresponding to packets 44B-44D, which are described below in more detail.

Dequeue operation 34B traverses previously selected L1 node 38 in a manner substantially similar to root node 36. Assuming dequeue operation 34B retrieves the mask with the same priority as that previously selected, dequeue operation 34B first retrieves $G_M$ mask 48' associated with L1 node 38 and applies this mask to the array associated with L1 node 38. Upon applying this mask 48', dequeue operation 34B identifies L2 node 40A as available and providing access to at least one queue associated with scheduling priority $G_M$. Dequeue operation 34B, therefore, selects L2 node 40A.

Figure 2F:
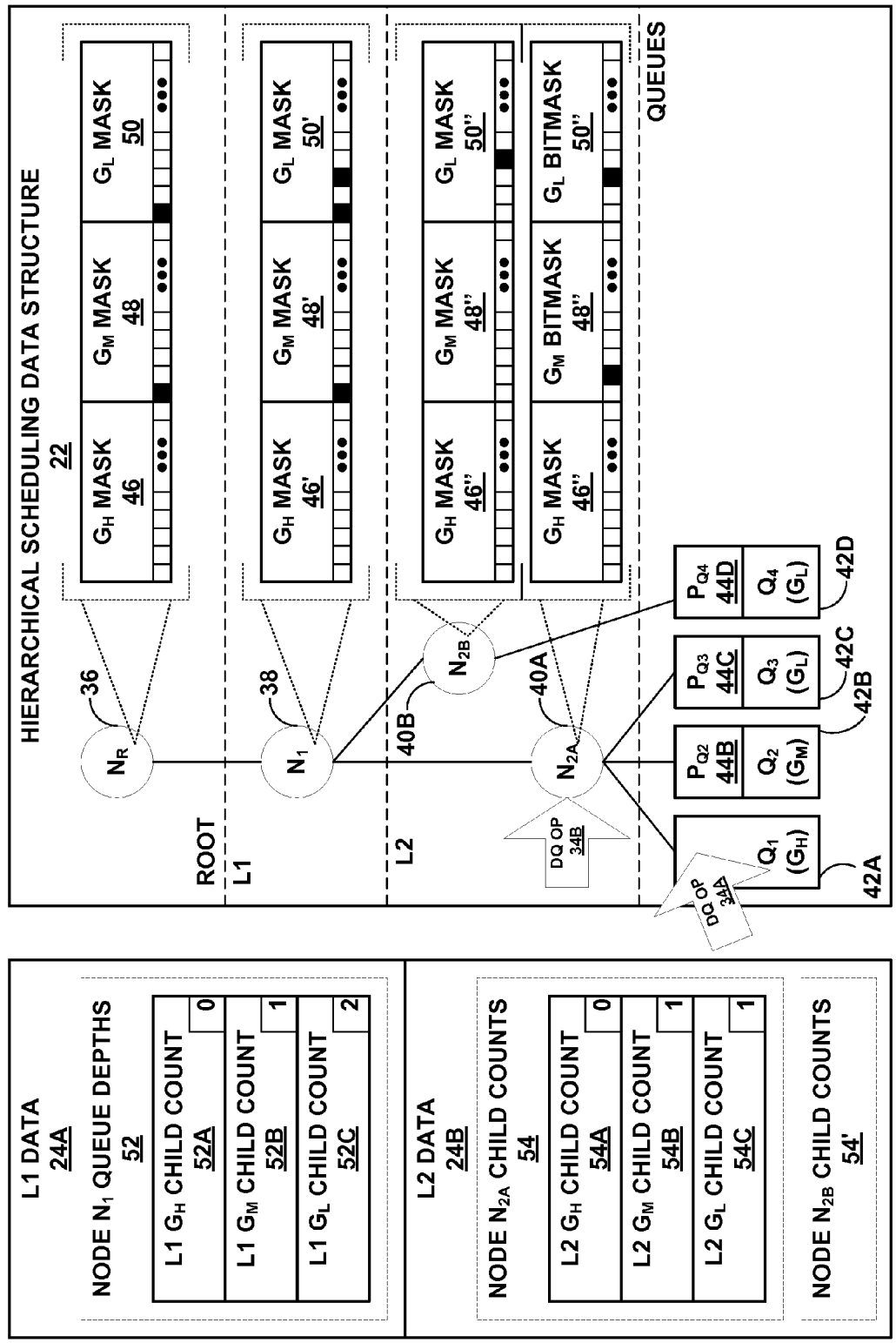

FIG. 2F is a block diagram illustrating hierarchical scheduling data structure 22 and scheduling data 24 after dequeue operations 34A, 34B have traversed queue 42A and L1 node 38, respectively. As shown in the example of FIG. 2F, dequeue operation 34A has updated GH mask 46" to mask queue 42A, while dequeue operation 34B has traversed to L2 node 40A. Dequeue operation 34A continues to perform the additional operations that are described below in more detail with respect to the example of FIG. 3. Some of these additional operations involve dequeuing the last chunk from queue 42A and updating child counts 52A and 54A by decrementing these by one to zero, which is shown in the example of FIG. 2F.

Figure 2G:
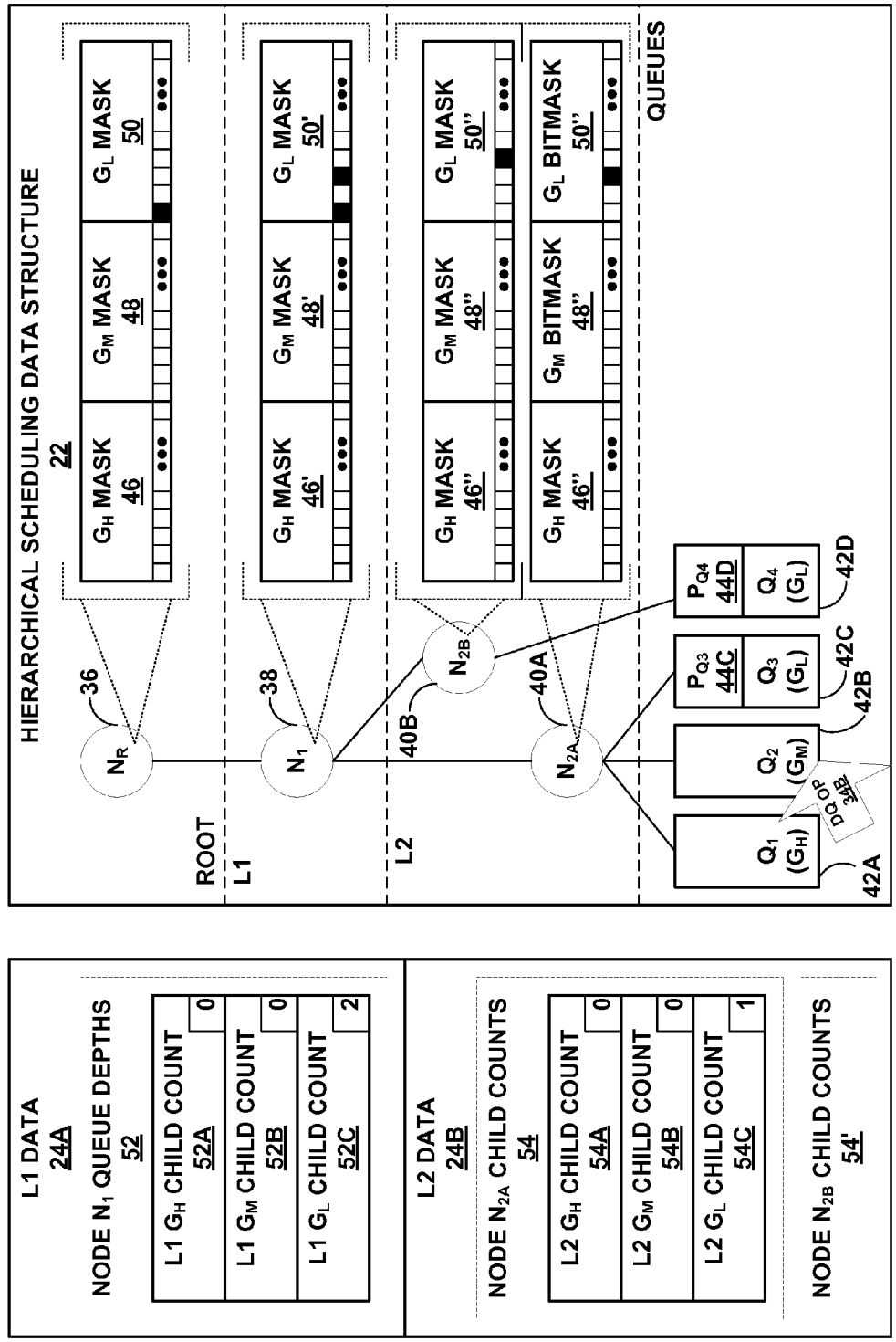

Assuming dequeue operation 34B retrieves the mask with the same priority as that previously selected, dequeue operation 34B first retrieves $G_M$ mask 48" associated with L2 node 40A and applies this mask to the array associated with L2 node 40A. Upon applying this mask 48", dequeue operation 34B identifies queue 42B as available and associated with scheduling priority $G_M$. Dequeue operation 34B, therefore, selects queue 42B. Upon selecting these FIG. 2G is a block diagram illustrating hierarchical scheduling data structure 22 and scheduling data 24 after dequeue operations 34A, 34B have traversed queues 42A, 42B, respectively. While not shown in FIG. 2G, dequeue module 32 may initiate yet another dequeue operation, but FIG. 2G does not show this additional dequeue operation for ease of illustration purposes. Dequeue operation 34A has finished traversing hierarchical scheduling data structure 22, while dequeue operation 34B has dequeued packet 44B from queue 42B. Dequeue operation 34B has also updated GM masks 48 and 48" as well as performed some of the additional operations described below in more detail with respect to FIG. 3, including updating child counts 52B and 54B in a manner substantially similar to dequeue operation 34A updating counts 52A and 54A.

FIGS. 3A-3D are flowcharts illustrating example operation by a first dequeue operation and a second dequeue operation of a packet scheduler in performing the efficient packet scheduling techniques of this disclosure. The efficient packet scheduling techniques of this disclosure are described for purposes of illustration with respect to dequeue operations 34 of packet scheduler 18 as shown in FIGS. 1 and 2A-2G. The techniques however should not be limited to this example and may be performed by any network device capable of receiving and forwarding packets, such as IP packets, or any other discrete data unit, such as Ethernet frames, asynchronous transfer mode (ATM) cells, and multi-protocol label switching (MPLS) packets.

Figure 3A:
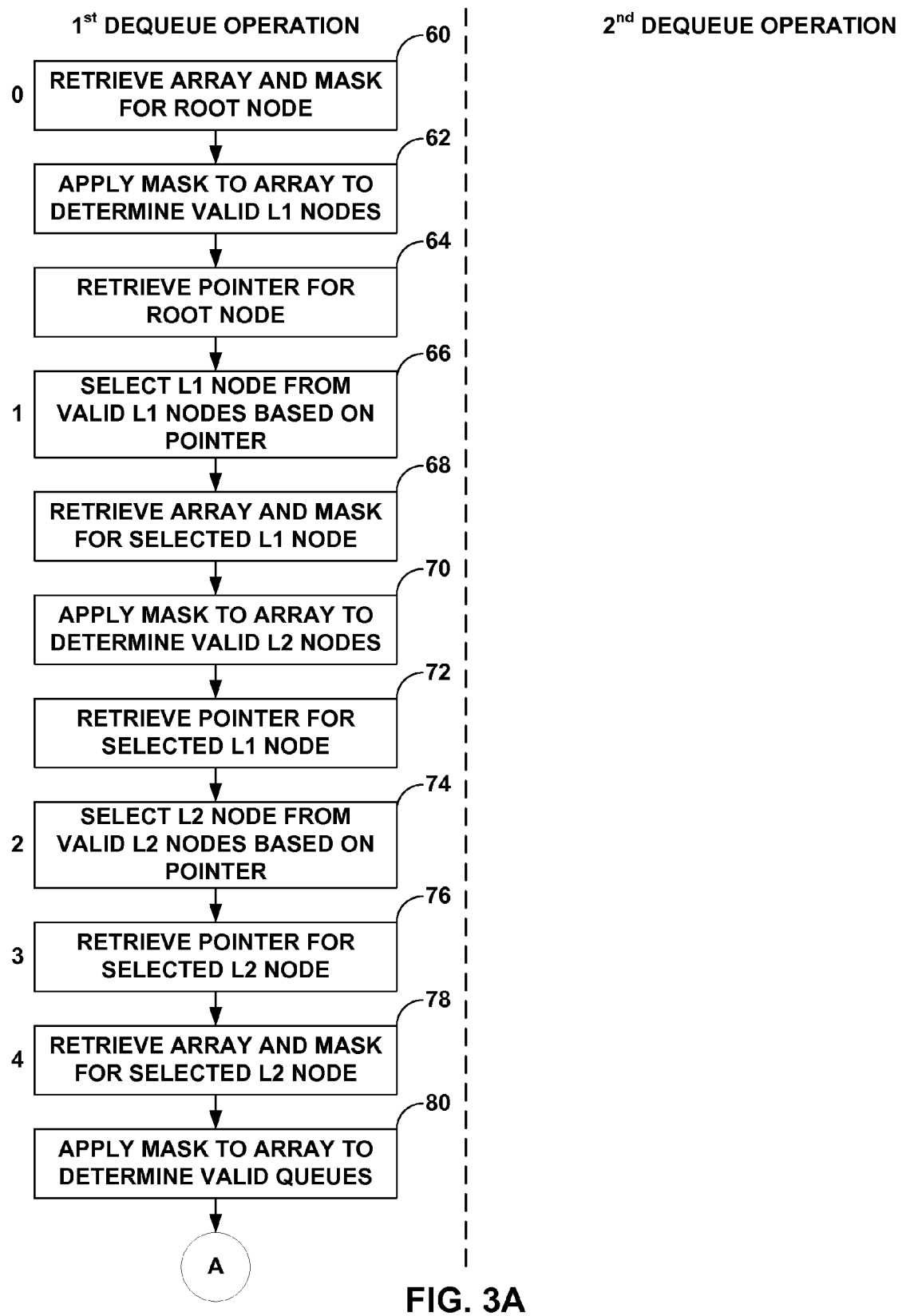
FIGS. 3A-3D are flowcharts illustrating example operation by a first dequeue operation and a second dequeue operation of a packet scheduler in performing the efficient packet scheduling techniques of this disclosure.

Referring first to FIG. 3A, a first dequeue operation 34A, which is shown in FIG. 2A, initially retrieves an array and mask for root node 36 and applies the mask to the array to determine valid L1 nodes that depend from root node 36 in the manner described above (60, 62). As noted above, dequeue module 32 of FIG. 1 may represent a pipelined hardware component that is arranges so as to perform dequeue operations 34 at least partially in parallel, which is referred to herein as concurrent execution. This pipeline architecture usually executes dequeue operations as hardware threads in approximately 12 clock cycles, which are shown as clock cycles 0 through 11 in the examples of FIGS. 3A-3D. These clock cycles are shown in the examples of FIGS. 3A-3D to the left of the first dequeue operation and the right of the second dequeue operation. The clock cycles in FIGS. 3A-3D however are not literal but only approximate. To illustrate, the retrieval of arrays and masks and the application of the masks to the array is shown in FIG. 3A to require a single clock cycle, but may, when implemented consume the first cycle and a portion of the second cycle. Consequently, reference to clock cycles is only approximate and the techniques should not be limited in this respect.

Dequeue module 32 typically includes in its pipeline a first stage capable of retrieving each of masks 46-50 associated with root node 36 and applying these masks 46-50 to a copy of the bitmask in parallel such that the application of all five masks consumes only a single clock cycle. This pipeline the compares the result of the application of these masks 46-50 (plus the other two which are not shown in FIGS. 2A-2G) in a second stage using what is referred to a priority multiplexer ("mux"), which outputs the valid L1 nodes in this instance, during a portion of the second clock cycle and indicates the priority to which these L1 nodes correspond, i.e., the $G_H$ scheduling priority. Dequeue operation 34A then retrieves the pointer for root node 36 and selects one of the valid L1 nodes based on the pointer, as described above (64). In this instance, dequeue operation 34A selects L1 node 38.

After selecting L1 node 38, dequeue operation 34A retrieves the array and masks 46'-50' for selected L1 node 38 and applies masks 46' to the array to identify valid L2 nodes that depend from L1 node 38 and which correspond to the $G_H$ priority, as L1 node 38 was selected using the $G_H$ mask. (68, 70). Dequeue operation 34A then retrieves the pointer for selected L2 node 38 and selects L2 node 40A from the identified valid L2 nodes based on the pointer, again as described above in detail (72, 74). Dequeue operation 34A proceeds as described above to retrieve the pointer, array and mask 46" for selected L2 node 40A (76, 78). Dequeue operation 34A applies mask 46" to the array to determine or otherwise identify valid queues (80).

Figure 3B:
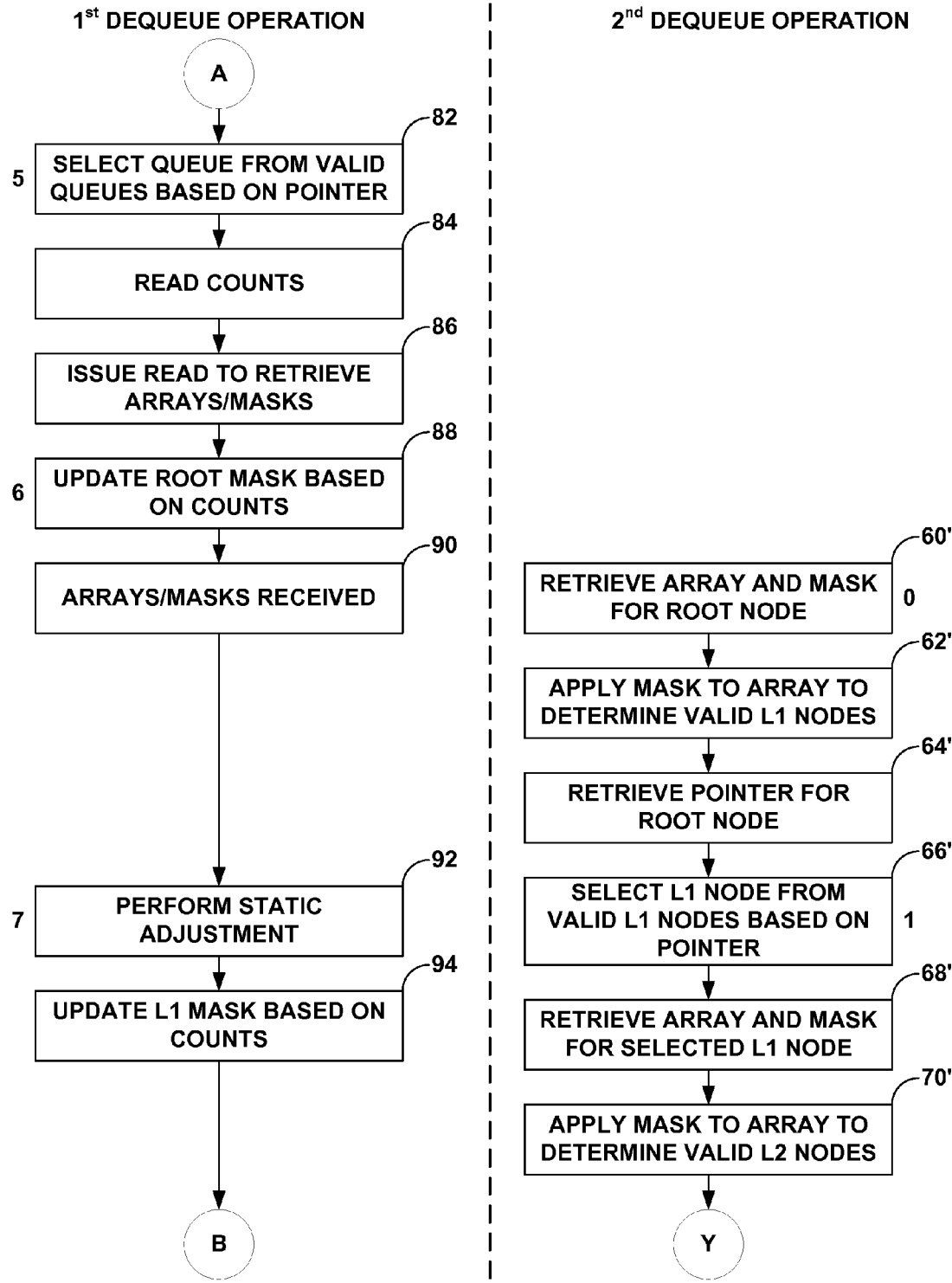

Referring to FIG. 3B, based on the retrieved pointer, dequeue operation 34A selects a queue from the identified valid queues, where in this example dequeue operation 34A selects queue 42A in the exemplary manner described above (82). After selecting queue 42A, dequeue operation 34A reads L1 GH child count 52A, L2 GH child count 54A and the queue depth corresponding to queue 42A from respective L1 data 24A, L2 data 24B and queue data 24C (84). Dequeue operation 34A also issues a read to retrieve the root arrays and mask 46 (86), which dequeue operation 34A updates based on counts 52A, 54A and queue depth 24C in the manner described above (88). With respect to the examples of FIGS. 3A-3G, dequeue operation 34A updates $G_H$ mask 46 to mask node 38 at least with respect to the $G_H$ scheduling priority.

Meanwhile, dequeue module 32 initiates another dequeue operation 34B in the pipeline, which initially retrieves an array and mask for root node 36 and applies the mask to the array to determine valid L1 nodes that depend from root node 36 in the manner substantially similar to that described above with respect to dequeue operation 34A (60', 62'). As a result of the substantial similarities, these steps of the flowchart in FIGS. 3A-3B denoted as a "$2^{nd}$ dequeue operation" are denoted with the same numeral as those of the steps denoted as a "$1^{st}$ dequeue operation." However, to differentiate these steps from one another, the steps of the second dequeue operation are labeled with a prime ('). In any event, dequeue operation 34B then retrieves the pointer for root node 36 and selects one of the valid L1 nodes based on the pointer, as described above (64'). In this instance, dequeue operation 34B selects L1 node 38 with respect to scheduling priority $G_M$ as a result of updating mask 46.

Figure 3C:
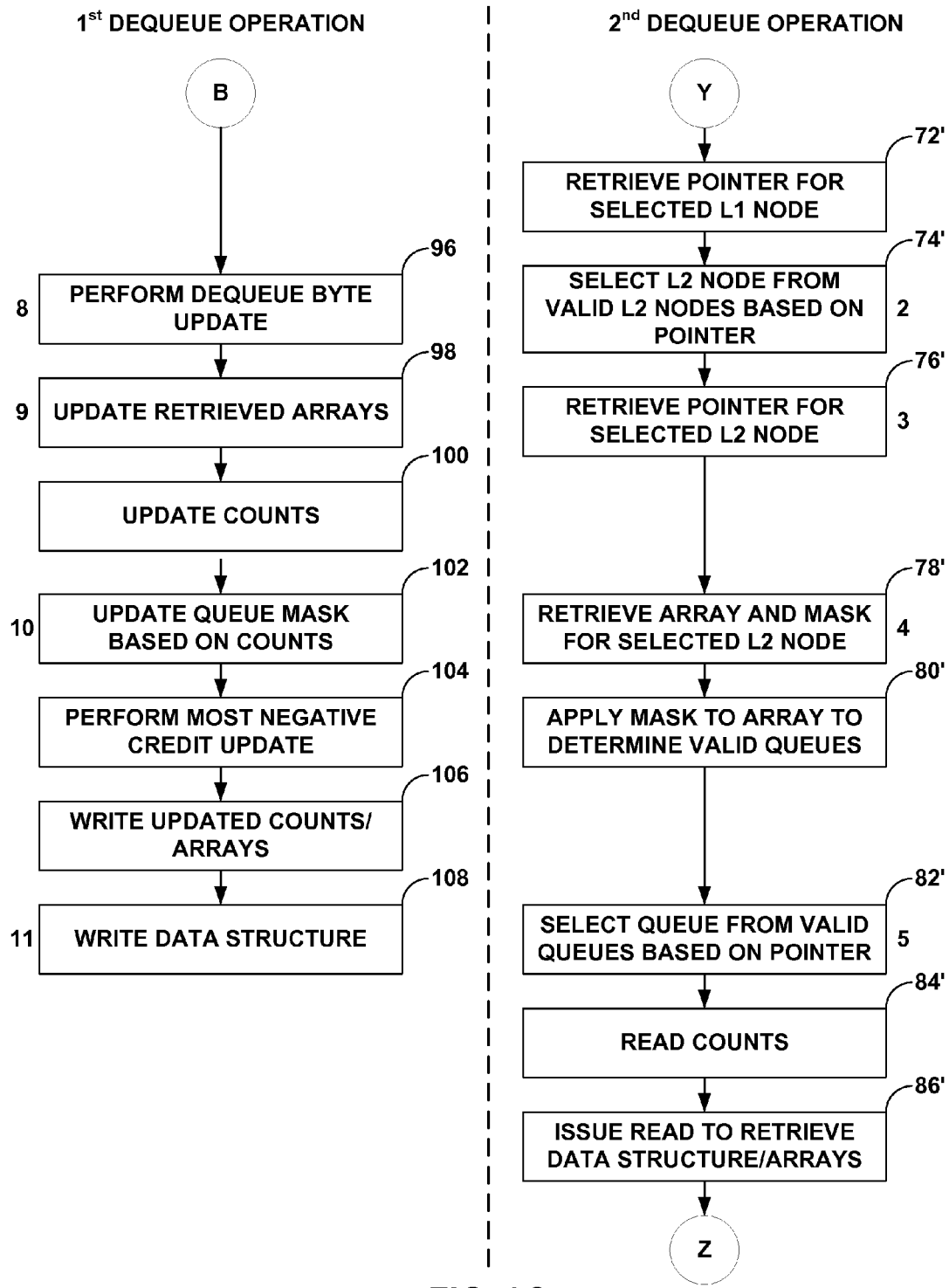
Figure 3D:
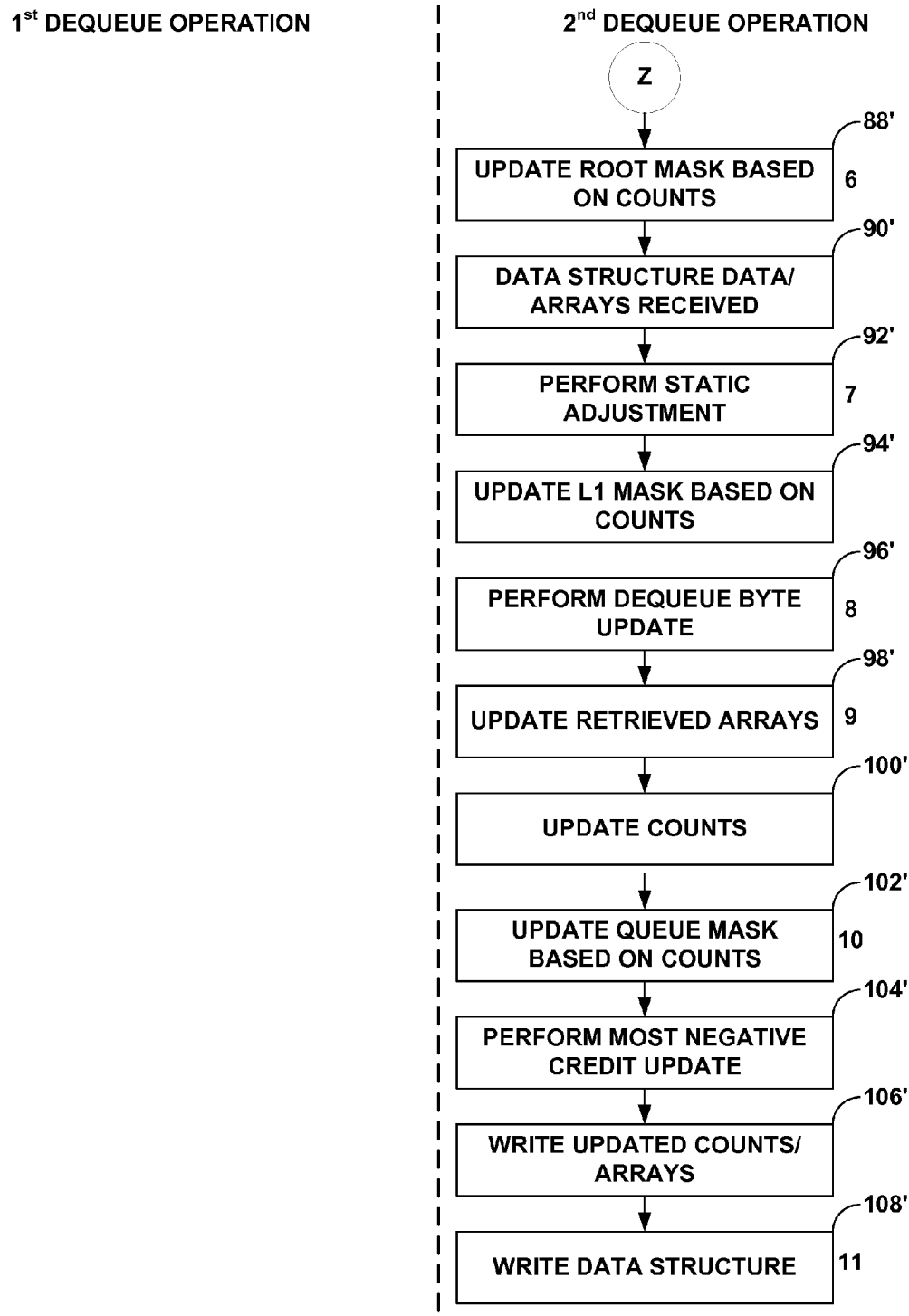

After selecting L1 node 38, dequeue operation 34B retrieves the array and masks 46'-50' for selected L1 node 38 and applies masks 48' to the array to identify valid L2 nodes that depend from L1 node 38 and which correspond to the $G_M$ priority, as L1 node 38 was selected using the $G_M$ mask. (68', 70'). Referring to FIG. 3C, dequeue operation 34B then retrieves the pointer for selected L2 node 38 and selects L2 node 40A from the identified valid L2 nodes based on the pointer, again as described above in detail (72', 74'). Dequeue operation 34B proceeds as described above to retrieve the pointer, array and mask 48" for selected L2 node 40A (76', 78'). Dequeue operation 34B applies mask 48" to the array to determine or otherwise identify valid queues (80'). Based on the retrieved pointer, dequeue operation 34B selects a queue from the identified valid queues, where in this example dequeue operation 34B selects queue 42B in the exemplary manner described above (82').

After selecting queue 42A, dequeue operation 34B reads L1 $G_M$ child count 52B, L2 $G_H$ child count 54B and the queue depth corresponding to queue 42B from respective L1 data 24A, L2 data 24B and queue data 24C (84'). Dequeue operation 34B also issues a read to retrieve the root arrays and mask 48 (86'), which dequeue operation 34B updates based on counts 52B, 54B and the queue depth in the manner described above (88'). With respect to the examples of FIGS. 3A-3G, dequeue operation 34B updates $G_M$ mask 46 to mask node 38 at least with respect to the $G_M$ scheduling priority.

While dequeue operation 34B executes in the manner noted above, dequeue operation 34A, referring back to FIG. 3B, receives the arrays and masks for which it requested via a read request (90). Dequeue operation 34A performs the additional operations mentioned above by first performing what is referred to as a "static adjustment" (92). In some instances, a packet undergoes additional processing after being dequeued that adds an additional static amount of data to the packet, such as appending a media access control (MAC) address to the packet. To adequately asses how much bandwidth is consumed by the packet, various static adjustments, such as adding 4 bytes to a counter to account for the to-be-appended MAC address, can be made. After or while performing this static adjustment, dequeue operation 34 also updates L1 mask associated with the $G_H$ scheduling priority based on the counts, as noted above (94).

Referring again to FIG. 3C, dequeue operation 34A performs a dequeue byte update (96). Next, dequeue operation 34A updates the retrieved arrays and the counts, as described above (98, 100). Following these updates, dequeue operation 34A updates the queue mask associated with the selected queue, queue 42A, in the manner described above (102). Dequeue operation 34A also determines what is commonly referred to as a "most negative credit." Dequeue operation 34A evaluates the credits assigned to each of queues 42 to determine the number of credits to add to each of queues 42 to make the one of queues 42 having the most negative credit equal zero. In this respect, dequeue operation 34A performs a most negative credit update (104). As shown in the example of FIG. 3C, dequeue operation 34A finishes executing by writing updated counts and arrays, as well as, various data to data structure 24 (106, 108).

Dequeue operation 34B continues to retrieve the queue data associated with selected queue 42B and dequeue packet 44B, before finishing it operation by performing the additional steps in substantially a similar manner to that described above with respect to dequeue operation 34A (90'-108').

Various embodiments of the invention have been described. These and other embodiments are within the scope of the following claims.

The invention claimed is:

1. A method comprising:
   storing, with a network device, data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents a network interface of the network device that provides a maximum bandwidth and the remaining nodes of the plurality of nodes represent allocations of portions of the maximum bandwidth provided by the network interface;
   storing, with the network device, corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes;
   executing, with the network device, a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering; and
   executing, with the network device, a second dequeue operation concurrently with the execution of the first dequeue operation;
   masking, with the first dequeue operation of the network device, at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation, wherein during execution, the second dequeue operation traverses the plurality of hierarchically-ordered nodes and schedules delivery of a portion of a second packet stored to one of the plurality of queues; and
   processing the portion of the first packet and the portion of the second packet with the network device as these portions are dequeued.

2. The method of claim 1, wherein storing data defining a plurality of nodes comprises:
   storing data defining an array for each of the plurality of hierarchically-ordered nodes that identifies a relationship between the node and either at least one of the plurality of hierarchically-ordered nodes in a level of the hierarchical ordering below the node or at least one of the plurality of queues; and
   storing data defining a mask for each of the plurality of hierarchically-ordered nodes that identifies either those of the plurality of hierarchically-ordered nodes in the level of the hierarchical ordering below the node that provides access to queues that are available to be serviced by a dequeue operation or those of the queues that are available to be serviced by the dequeue operation.

3. The method of claim 2, wherein executing the first dequeue operation to traverse the plurality of hierarchically-ordered nodes comprises:
   retrieving the array and the mask for one of the plurality of hierarchically-ordered nodes;
   applying the mask to the array to determine one or more lower layer nodes or queues in a layer below the one of the plurality of leaf nodes that are available; and
   selecting one of the lower layer nodes or queues that are available in accordance with a round robin algorithm or a weighted round robin algorithm.

4. The method of claim 2,
   wherein the first dequeue operation updates the scheduling data associated with the at least one of the selected ones of the plurality of hierarchically-ordered nodes from which the selected one of the queues depends in the hierarchical ordering by decrementing the child count associated with the at least one of the selected ones of the plurality of hierarchically-ordered nodes from which the selected one of the queues depends in the hierarchical ordering by one, and wherein masking the at least one selected ones of the plurality of hierarchically-ordered nodes based on the updated scheduling data comprises updating the mask associated with the root node from which the selected one of the plurality of queues is accessible to remove the at least one of the selected one of the plurality of hierarchically-ordered nodes that depends from the root node from the mask based on a determination that the updated child count associated with the at least one of the selected one of the plurality of hierarchically-ordered nodes that depends form the root node equals zero.

5. The method of claim 4, wherein the second dequeue operation traverses the selected one of the hierarchically-ordered nodes by retrieving the updated mask and the array associated with the root node, applying the retrieved updated mask to the retrieved array to determine that one or more nodes of the plurality of hierarchically-ordered nodes in a layer of the hierarchical ordering below the root node are available, and selecting one of the one or more lower layer nodes that are available in accordance with a round robin algorithm or a weighted round robin algorithm, and wherein the one or more of the lower layer nodes do not include the masked at least one selected ones of the plurality of hierarchically-ordered nodes.

6. The method of claim 1, wherein storing data defining a plurality of nodes comprises:

storing data defining an array for each of the plurality of hierarchically-ordered nodes that identifies a relationship between the node and either at least one of the plurality of hierarchically-ordered nodes in a level of the hierarchical ordering below the node or at least one of the plurality of queues; and storing data defining a plurality of masks for each of the plurality of hierarchically-ordered nodes that identifies either those of the plurality of hierarchically-ordered nodes in the level of the hierarchical ordering below the node that provides access to those of the plurality of queues associated with a corresponding one of a plurality of scheduling priorities that are available to be serviced by a dequeue operation or those of the queues associated with the corresponding one of the plurality of scheduling priorities that are available to be serviced by the dequeue operation.

7. The method of claim 6, wherein executing the first dequeue operation to traverses the plurality of hierarchically-ordered nodes comprises:

retrieving the array and the plurality of masks for one of the plurality of hierarchically-ordered nodes;

applying the plurality of masks to the array to determine one or more lower layer nodes or queues in a layer below the one of the plurality of hierarchically-ordered nodes that are available for each of the corresponding one of the scheduling priorities;

from those of the lower layer nodes or queues that are available, selecting either those of the lower layer nodes that provide access to those of the plurality of queues associated with a highest remaining one of the plurality of scheduling priorities or those of the plurality of queues associated with the highest remaining one of the plurality of scheduling priorities; and selecting one of either those of the lower layer nodes that are available and provide access to queues associated with the highest remaining one of the plurality of scheduling priorities or those of the plurality of queues associated with the highest remaining one of the plurality of scheduling priorities in accordance with a round robin algorithm or a weighted round robin algorithm.

8. The method of claim 7, wherein the scheduling data defines for each of the root node and those of plurality of nodes positioned between the root node and the plurality of leaf nodes, a plurality of child counts, each of which corresponds to a different one of the plurality of scheduling priorities and defines a total number of the plurality of hierarchically-ordered nodes directly depending from each of the root node and those of the plurality of nodes positioned between the root node and the plurality of leaf nodes, respectively, that provide access to the plurality of queues assigned a respective one of the plurality of scheduling priorities, wherein scheduling data also defines, for each of a plurality of leaf nodes, a plurality of queue depths, each of which corresponds to a different one of the plurality of scheduling priorities and defines a queue depth for those of the plurality of queues accessible from each of the hierarchically-ordered nodes and assigned the corresponding one of the plurality of scheduling priorities;

wherein the first dequeue operation updates the scheduling data associated with the at least one of the selected ones of the plurality of hierarchically-ordered nodes by decrementing by one the plurality of child counts and queue depths associated with the at least one selected ones of the plurality of hierarchically-ordered nodes, and wherein masking the at least one selected ones of the plurality of hierarchically-ordered nodes based on the updated scheduling data comprises updating one of the plurality of masks associated with the root node and a selected one of the plurality of scheduling priorities to mask the at least one of the selected one of the plurality of hierarchically-ordered nodes that depends from the root node based on a determination that the updated one of the plurality of child counts associated with the selected ones of the plurality of scheduling priorities and the at least one of the selected one of the plurality of hierarchically-ordered nodes that depends form the root node equals zero.

9. The method of claim 8, wherein the second dequeue operation traverses the selected one of the hierarchically-ordered nodes by retrieving the updated one of the plurality of masks and the array associated with the root node of the hierarchically-ordered nodes, applies the retrieved updated one of the plurality of masks to the array to determine that one or more nodes of the plurality of hierarchically-ordered nodes in a layer of the hierarchical ordering below the root nodes are available, and selects one of the one or more lower layer nodes that are available with respect to the highest remaining one of the plurality of scheduling priorities in accordance with a round robin algorithm or a weighted round robin algorithm, and wherein the one or more of the lower layer nodes do not include the masked the at least one selected ones of the plurality of hierarchically-ordered nodes.

10. The method of claim 1, wherein the network device includes a multi-threaded pipeline processor that executes the first and second dequeue operations concurrently.

11. The method of claim 1, wherein the hierarchical ordering includes:

a root layer that includes the root node representative of the maximum bandwidth of the network interface;

a first layer that includes one or more of the remaining hierarchically-ordered nodes not included within any other one of the layers of the hierarchical ordering, each of which represents a different stream of the maximum bandwidth shared by one or more devices associated with one or more customers; and a second layer that includes one or more of the remaining hierarchically-ordered nodes not included within any other one of the layers of the hierarchical ordering, each of which represents a different allocation of the bandwidth represented by the one of the streams to which each of these second layer nodes depends.

12. The method of claim 1,
wherein the network device comprises a router, and
wherein the first and second dequeue operations comprise different hardware threads.

13. A network device comprising:
a network interface that provides a maximum bandwidth;
a plurality of queues that store one or more portions corresponding to one or more network packets; and
a control unit that stores data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents the network interface that provides the maximum bandwidth and the remaining nodes of the plurality of nodes represent allocations of portions of the maximum bandwidth provided by the network interface;
wherein the control unit also stores corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes,
wherein the control unit includes a dequeue module that executes, a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering,
wherein the dequeue module also executes a second dequeue operation concurrently with the execution of the first dequeue operation,
wherein the first dequeue operation masks at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation,
wherein, during execution, the second dequeue operation traverses the plurality of hierarchically-ordered nodes and schedules delivery of a portion of a second packet stored to one of the plurality of queues, and
wherein the control unit processes the portion of the first packet and the portion of the second packet with the network device as these portions are dequeued.

14. The network device of claim 13,
wherein the control unit stores data defining an array for each of the plurality of hierarchically-ordered nodes that identifies a relationship between the node and either at least one of the plurality of hierarchically-ordered nodes in a level of the hierarchical ordering below the node or at least one of the plurality of queues, and
wherein the control unit also stores data defining a mask for each of the plurality of hierarchically-ordered nodes that identifies either those of the plurality of hierarchically-ordered nodes in the level of the hierarchical ordering below the node that provides access to queues that are available to be serviced by a dequeue operation or those of the queues that are available to be serviced by the dequeue operation.

15. The network device of claim 14, wherein, during execution, the first dequeue operation retrieves the array and the mask for one of the plurality of hierarchically-ordered nodes, applies the mask to the array to determine one or more lower layer nodes or queues in a layer below the one of the plurality of leaf nodes that are available, and selects one of the lower layer nodes or queues that are available in accordance with a round robin algorithm or a weighted round robin algorithm.

16. The network device of claim 14,
wherein the first dequeue operation updates the scheduling data associated with the at least one of the selected ones of the plurality of hierarchically-ordered nodes from which the selected one of the queues depends in the hierarchical ordering by decrementing the child count associated with the at least one of the selected ones of the plurality of hierarchically-ordered nodes from which the selected one of the queues depends in the hierarchical ordering by one, and
wherein the first dequeue operation also updates the mask associated with the root node from which the selected one of the plurality of queues is accessible to remove the at least one of the selected one of the plurality of hierarchically-ordered nodes that depends from the root node from the mask based on a determination that the updated child count associated with the at least one of the selected one of the plurality of hierarchically-ordered nodes that depends form the root node equals zero.

17. The network device of claim 16,
wherein the second dequeue operation retrieves the updated mask and the array associated with the root node, applies the retrieved updated mask to the retrieved array to determine that one or more nodes of the plurality of hierarchically-ordered nodes in a layer of the hierarchical ordering below the root node are available, and selects one of the one or more lower layer nodes that are available in accordance with a round robin algorithm or a weighted round robin algorithm, and
wherein the one or more of the lower layer nodes do not include the masked at least one selected ones of the plurality of hierarchically-ordered nodes.

18. The network device of claim 13,
wherein the control unit stores data defining an array for each of the plurality of hierarchically-ordered nodes that identifies a relationship between the node and either at least one of the plurality of hierarchically-ordered nodes in a level of the hierarchical ordering below the node or at least one of the plurality of queues; and
wherein the control unit also stores data defining a plurality of masks for each of the plurality of hierarchically-ordered nodes that identifies either those of the plurality of hierarchically-ordered nodes in the level of the hierarchical ordering below the node that provides access to those of the plurality of queues associated with a corresponding one of a plurality of scheduling priorities that are available to be serviced by a dequeue operation or those of the queues associated with the corresponding one of the plurality of scheduling priorities that are available to be serviced by the dequeue operation.

19. The network device of claim 18,
wherein the first dequeue operation retrieves the array and the plurality of masks for one of the plurality of hierarchically-ordered nodes, and applies the plurality of masks to the array to determine one or more lower layer nodes or queues in a layer below the one of the plurality of hierarchically-ordered nodes that are available for each of the corresponding one of the scheduling priorities, and
wherein, from those of the lower layer nodes or queues that are available, the first dequeue operation selects either those of the lower layer nodes that provide access to those of the plurality of queues associated with a highest remaining one of the plurality of scheduling priorities or those of the plurality of queues associated with the highest remaining one of the plurality of scheduling priorities, and selects one of either those of the lower layer nodes that are available and provide access to queues associated with the highest remaining one of the plurality of scheduling priorities or those of the plurality of queues associated with the highest remaining one of the plurality of scheduling priorities in accordance with a round robin algorithm or a weighted round robin algorithm.

20. The network device of claim 19,
wherein the scheduling data defines for each of the root node and those of plurality of nodes positioned between the root node and the plurality of leaf nodes, a plurality of child counts, each of which corresponds to a different one of the plurality of scheduling priorities and defines a total number of the plurality of hierarchically-ordered nodes directly depending from each of the root node and those of the plurality of nodes positioned between the root node and the plurality of leaf nodes, respectively, that provide access to the plurality of queues assigned a respective one of the plurality of scheduling priorities,
wherein scheduling data also defines, for each of a plurality of leaf nodes, a plurality of queue depths, each of which corresponds to a different one of the plurality of scheduling priorities and defines a queue depth for those of the plurality of queues accessible from each of the hierarchically-ordered nodes and assigned the corresponding one of the plurality of scheduling priorities;
wherein the first dequeue operation updates the scheduling data associated with the at least one of the selected ones of the plurality of hierarchically-ordered nodes by decrementing by one the plurality of child counts and queue depths associated with the at least one selected ones of the plurality of hierarchically-ordered nodes, and
wherein the first dequeue operation updates one of the plurality of masks associated with the root node and a selected one of the plurality of scheduling priorities to mask the at least one of the selected one of the plurality of hierarchically-ordered nodes that depends from the root node based on a determination that the updated one of the plurality of child counts associated with the selected ones of the plurality of scheduling priorities and the at least one of the selected one of the plurality of hierarchically-ordered nodes that depends form the root node equals zero.

21. The network device of claim 20,
wherein the second dequeue operation traverses the selected one of the hierarchically-ordered nodes by retrieving the updated one of the plurality of masks and the array associated with the root node of the hierarchically-ordered nodes, applies the retrieved updated one of the plurality of masks to the array to determine that one or more nodes of the plurality of hierarchically-ordered nodes in a layer of the hierarchical ordering below the root nodes are available, and selects one of the one or more lower layer nodes that are available with respect to the highest remaining one of the plurality of scheduling priorities in accordance with a round robin algorithm or a weighted round robin algorithm, and
wherein the one or more of the lower layer nodes do not include the masked the at least one selected ones of the plurality of hierarchically-ordered nodes.

22. The network device of claim 13, wherein the control unit includes a multi-threaded pipeline processor that executes the first and second dequeue operations concurrently.

23. The network device of claim 13, wherein the hierarchical ordering includes:
a root layer that includes the root node representative of the maximum bandwidth of the network interface;
a first layer that includes one or more of the remaining hierarchically-ordered nodes not included within any other one of the layers of the hierarchical ordering, each of which represents a different stream of the maximum bandwidth shared by one or more devices associated with one or more customers; and
a second layer that includes one or more of the remaining hierarchically-ordered nodes not included within any other one of the layers of the hierarchical ordering, each of which represents a different allocation of the bandwidth represented by the one of the streams to which each of these second layer nodes depends.

24. The network device of claim 13,
wherein the network device comprises a router, and
wherein the first and second dequeue operations comprise different hardware threads.

25. A non-transitory computer-readable storage medium comprising instructions, that when executed by a processor, cause the processor to:
store data defining a plurality of nodes arranged in a hierarchical ordering from a root node to a plurality of leaf nodes, wherein each of the hierarchically-ordered nodes identify a relationship between the root node and the leaf nodes of the hierarchically-ordered nodes, and wherein each of the leaf nodes is associated with a different one of a plurality of queues storing one or more portions corresponding to at least one network packet, wherein the root node represents a network interface of a network device that provides a maximum bandwidth and the remaining nodes of the plurality of nodes represent allocations of portions of the maximum bandwidth provided by the network interface;

store corresponding scheduling data for the nodes of the hierarchical ordering, wherein the scheduling data defines for each of the root node and those of plurality of nodes positioned between the root node and the plurality of leaf nodes, a child count that indicates a total number of the plurality of nodes that depend from each of the root node and those of the plurality of nodes positioned between the root node and the plurality of leaf nodes, and wherein the scheduling data also defines for each of the plurality of leaf nodes a queue depth that indicates a total number of portions of packets stored by those queues of the plurality of queues associated with each of the plurality of leaf nodes;

execute a first dequeue operation to traverse the plurality of hierarchically-ordered nodes and schedule processing of a portion of a first packet stored to one of the plurality of queues, wherein during execution, the first dequeue operation selects one of the plurality of queues while traversing the plurality of hierarchically-ordered nodes and, upon selecting the one of the plurality of queues, updates the scheduling data associated with at least one of the plurality of hierarchically-ordered nodes from which the selected one of the queues depends in the hierarchical ordering; and execute a second dequeue operation concurrently with the execution of the first dequeue operation;

mask, with the first dequeue operation, at least one of the selected ones of the plurality of hierarchically-ordered nodes from which the selected one of the queues depends in the hierarchical ordering based on the updated scheduling data to exclude the node from consideration by the second dequeue operation concurrently executing with the first dequeue operation, wherein during execution, the second dequeue operation traverses the plurality of hierarchically-ordered nodes and schedules delivery of a portion of a second packet stored to one of the plurality of queues; and process the portion of the first packet and the portion of the second packet with the network device as these portions are dequeued.

* * * * *